(12) United States Patent
Kim et al.

(10) Patent No.: US 10,684,516 B2
(45) Date of Patent: Jun. 16, 2020

(54) LIQUID CRYSTAL DISPLAY

(71) Applicant: SAMSUNG DISPLAY CO., LTD., Yongin-si, Gyeonggi-do (KR)

(72) Inventors: Hoon Kim, Ansan-si (KR); Kyeong Jong Kim, Suwon-si (KR); Ki Chul Shin, Seongnam-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 242 days.

(21) Appl. No.: 15/409,634

(22) Filed: Jan. 19, 2017

(65) Prior Publication Data
US 2017/0336679 A1    Nov. 23, 2017

(30) Foreign Application Priority Data
May 18, 2016 (KR) .................. 10-2016-0060911

(51) Int. Cl.
*G02F 1/1343*    (2006.01)
*G09G 3/36*    (2006.01)
(Continued)

(52) U.S. Cl.
CPC ...... *G02F 1/134309* (2013.01); *G02F 1/1368* (2013.01); *G02F 1/134336* (2013.01); *G02F 1/136213* (2013.01); *G02F 1/136286* (2013.01); *G09G 3/2074* (2013.01); *G09G 3/3648* (2013.01); *G02F 1/1393* (2013.01); *G02F 2001/134345* (2013.01); *G02F 2001/134354* (2013.01); *G02F 2001/134372* (2013.01);
(Continued)

(58) Field of Classification Search
None
See application file for complete search history.

(56) References Cited

U.S. PATENT DOCUMENTS

2008/0278651 A1* 11/2008 Lee .................. G02F 1/133707
349/43
2010/0002161 A1* 1/2010 Shin .................. G02F 1/134363
349/38
(Continued)

FOREIGN PATENT DOCUMENTS

KR    10-2010-0004302 A    1/2010

OTHER PUBLICATIONS

Extended European Search Report, dated Sep. 8, 2017, by the EPO for European patent application No. 17155359.7.

*Primary Examiner* — Edward J Glick
*Assistant Examiner* — David Y Chung
(74) *Attorney, Agent, or Firm* — Kile Park Reed & Houtteman PLLC

(57) ABSTRACT

A liquid crystal display includes a first substrate, a first subpixel electrode, a connecting electrode, and a second subpixel electrode. The first subpixel electrode is on the first substrate and includes a first stem extending in a first direction and a plurality of branches extending from the first stem. The connecting electrode is electrically connected to the first subpixel electrode. The second subpixel electrode is on the same layer as the first subpixel electrode and includes a plurality of separation electrodes that do not overlap the connecting electrode. At least one of the separation electrodes is between a first sub branch and a second sub branch, which neighbor each other from among the branches. The second subpixel electrode is a floating electrode.

18 Claims, 22 Drawing Sheets

(51) Int. Cl.
  *G09G 3/20*   (2006.01)
  *G02F 1/1362*   (2006.01)
  *G02F 1/1368*   (2006.01)
  *G02F 1/139*   (2006.01)

(52) U.S. Cl.
  CPC .. *G02F 2201/121* (2013.01); *G02F 2201/123* (2013.01); *G02F 2201/124* (2013.01); *G02F 2201/15* (2013.01); *G02F 2203/30* (2013.01); *G09G 2300/0426* (2013.01); *G09G 2300/0447* (2013.01); *G09G 2300/0876* (2013.01); *G09G 2320/0271* (2013.01)

(56) References Cited

U.S. PATENT DOCUMENTS

| | | | |
|---|---|---|---|
| 2012/0001838 A1* | 1/2012 | Tsubata | G02F 1/134336 345/87 |
| 2012/0236245 A1 | 9/2012 | Jung et al. | |
| 2013/0050618 A1* | 2/2013 | Lo | G02F 1/134309 349/96 |
| 2013/0128206 A1* | 5/2013 | Nakano | G02F 1/1339 349/139 |
| 2013/0128207 A1* | 5/2013 | Nakano | G02F 1/1343 349/141 |
| 2014/0267962 A1 | 9/2014 | Jung et al. | |

* cited by examiner

[FIG. 1]
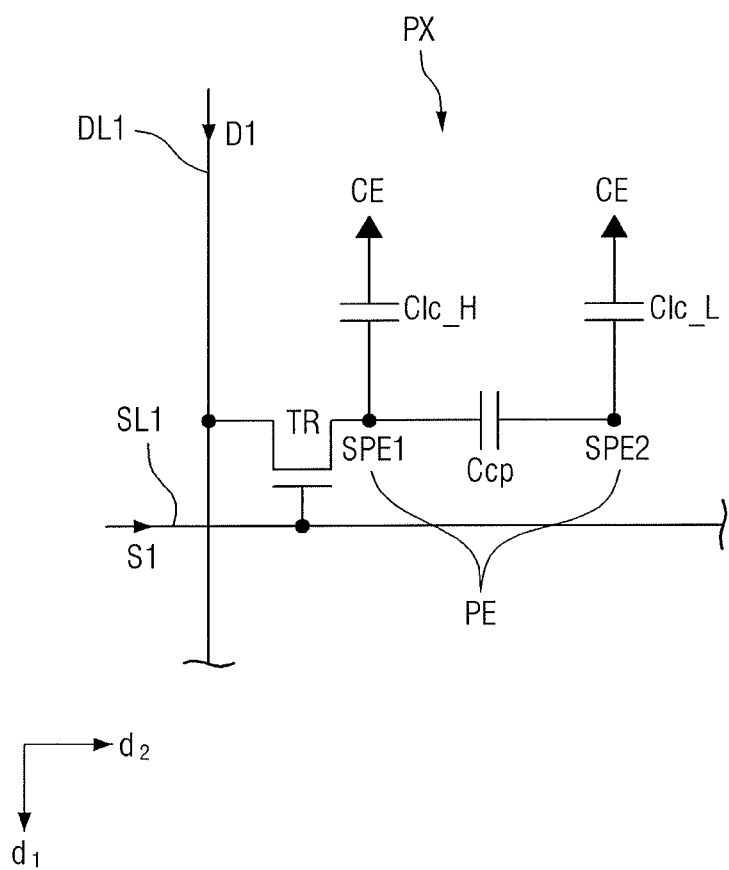

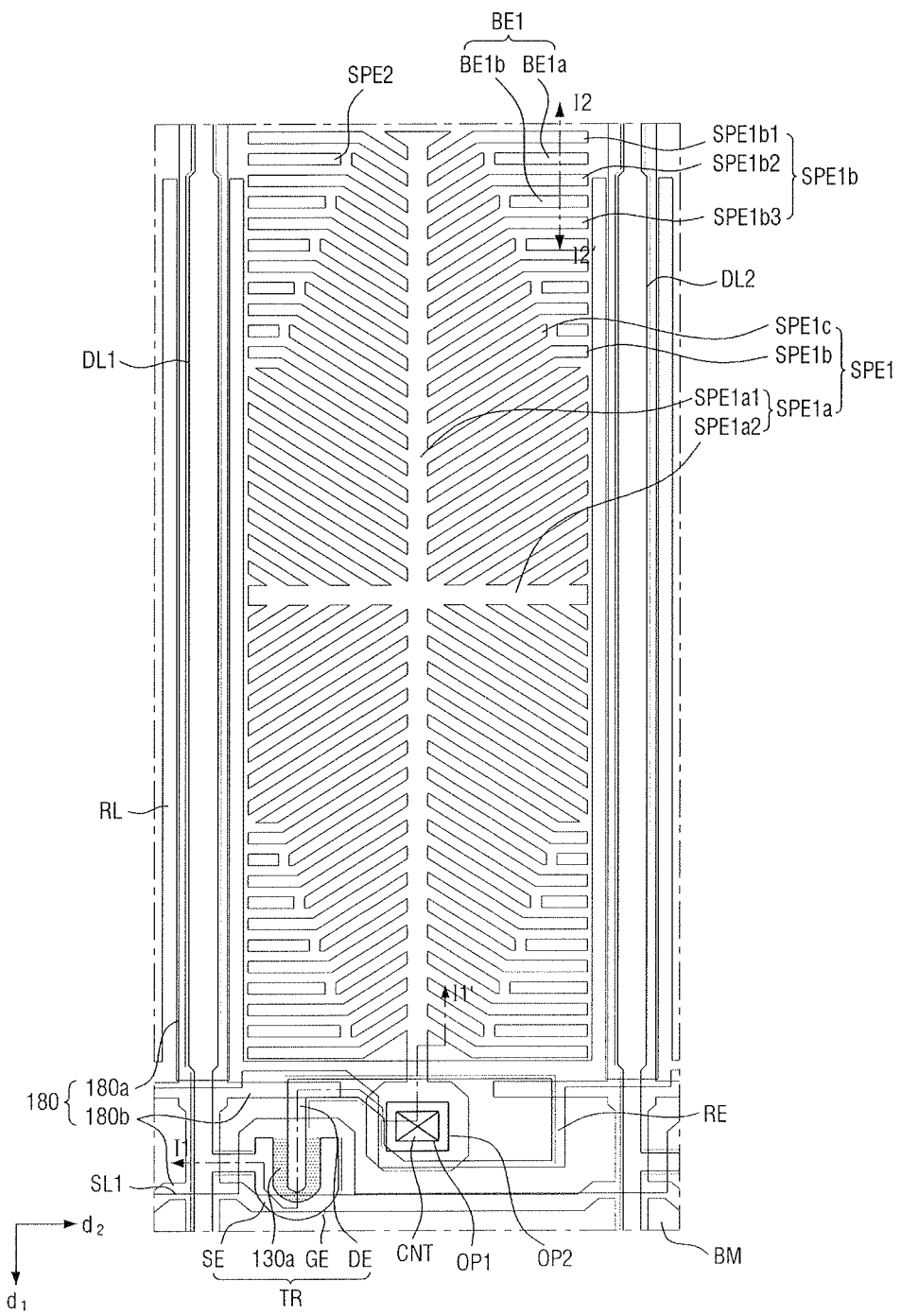
[FIG. 2]

[FIG. 3]
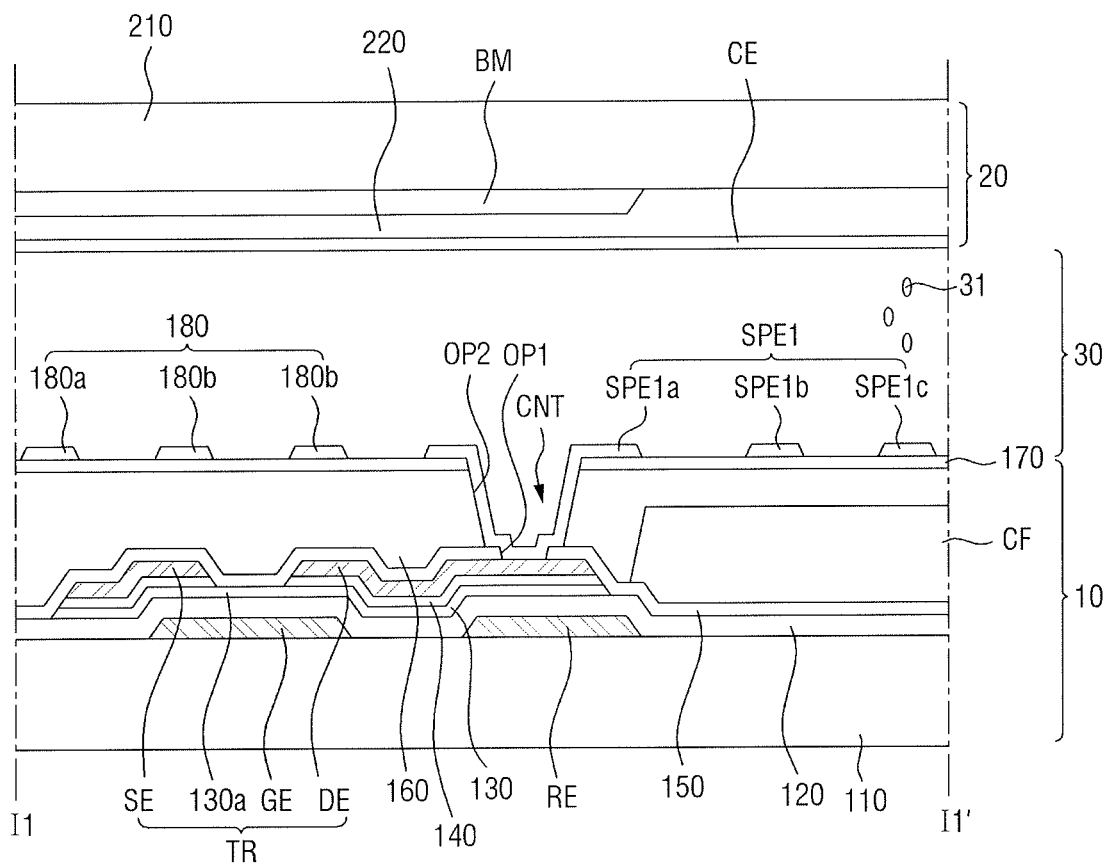

[FIG. 4]
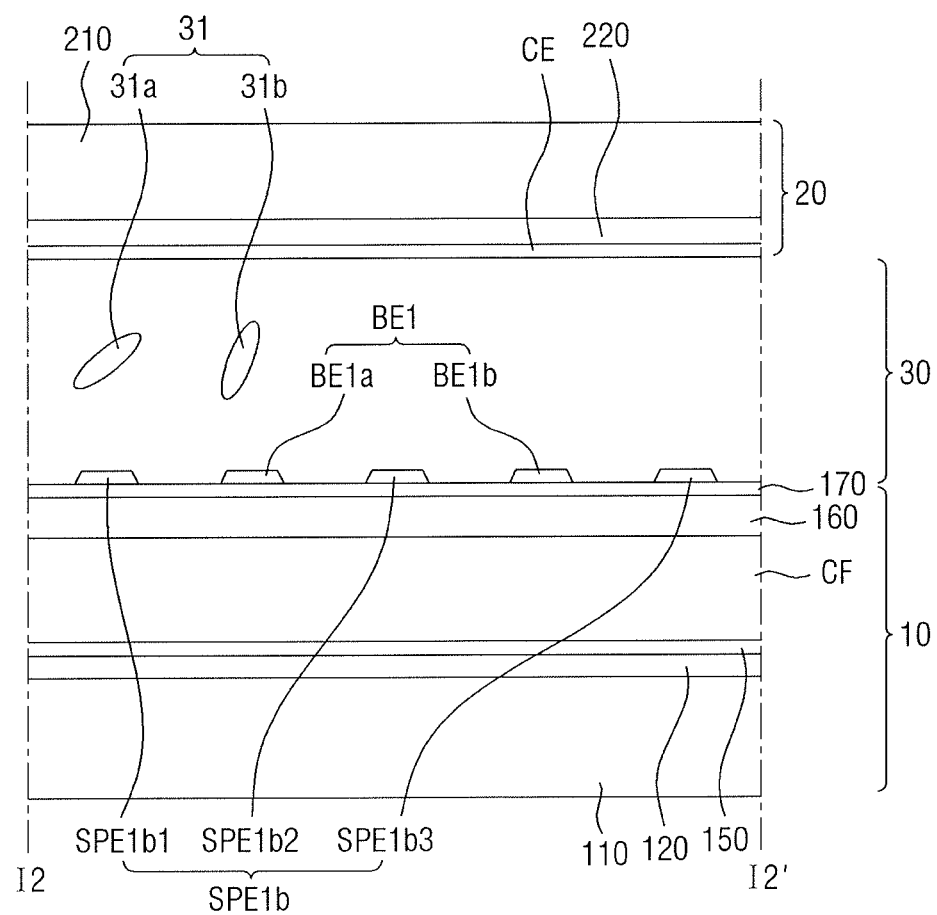

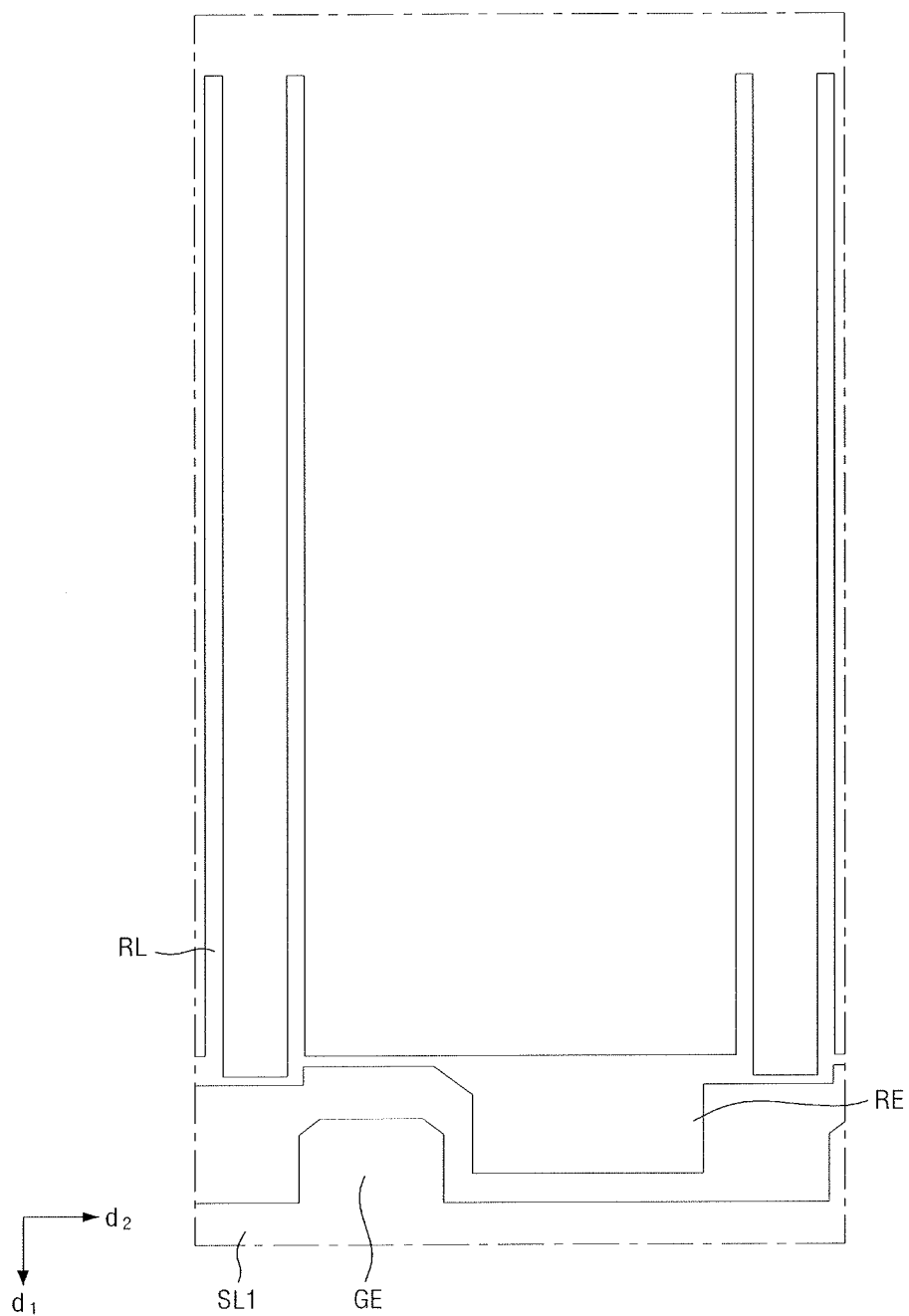
[FIG. 5]

[FIG. 6]
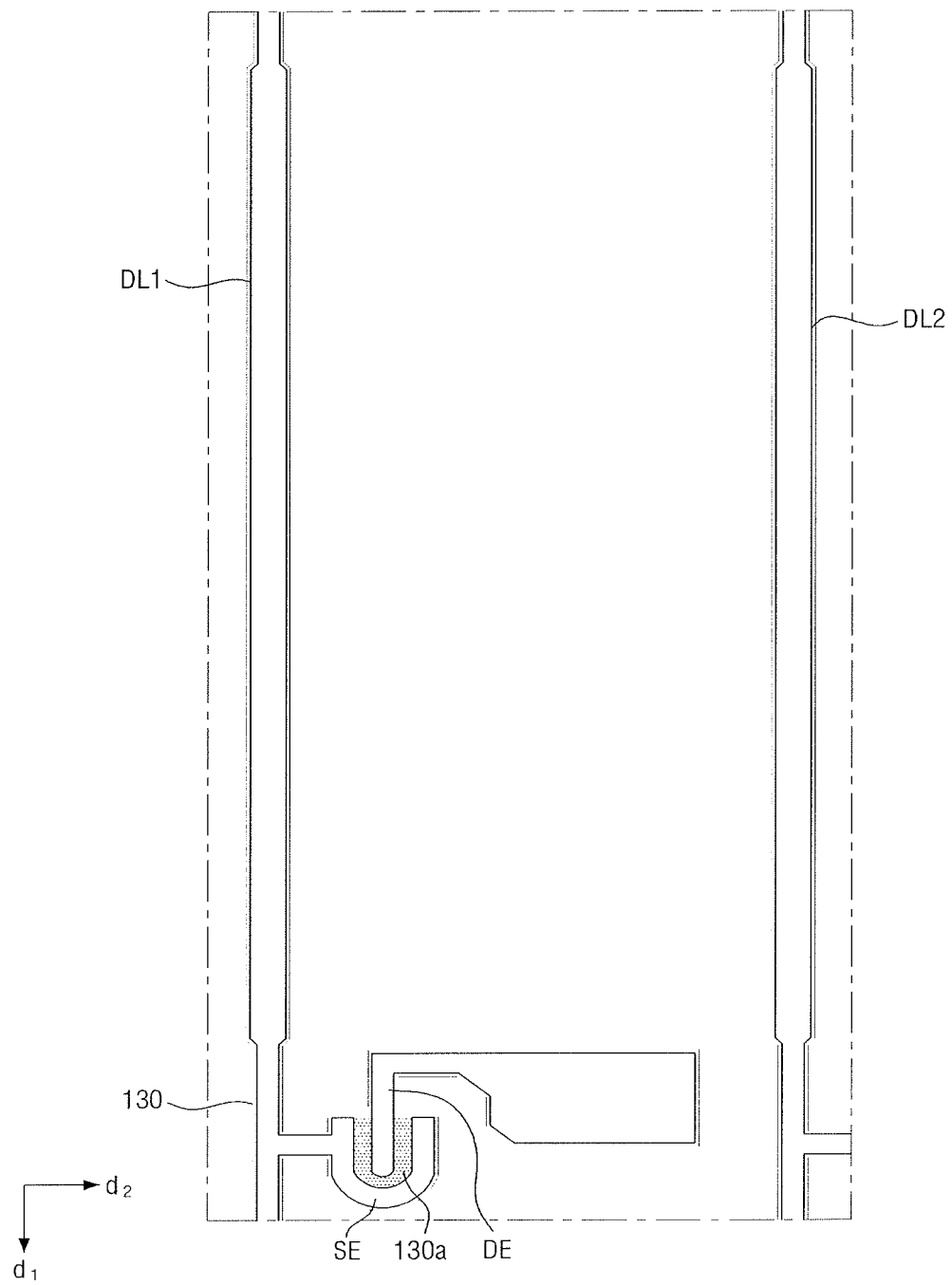

[FIG. 7]
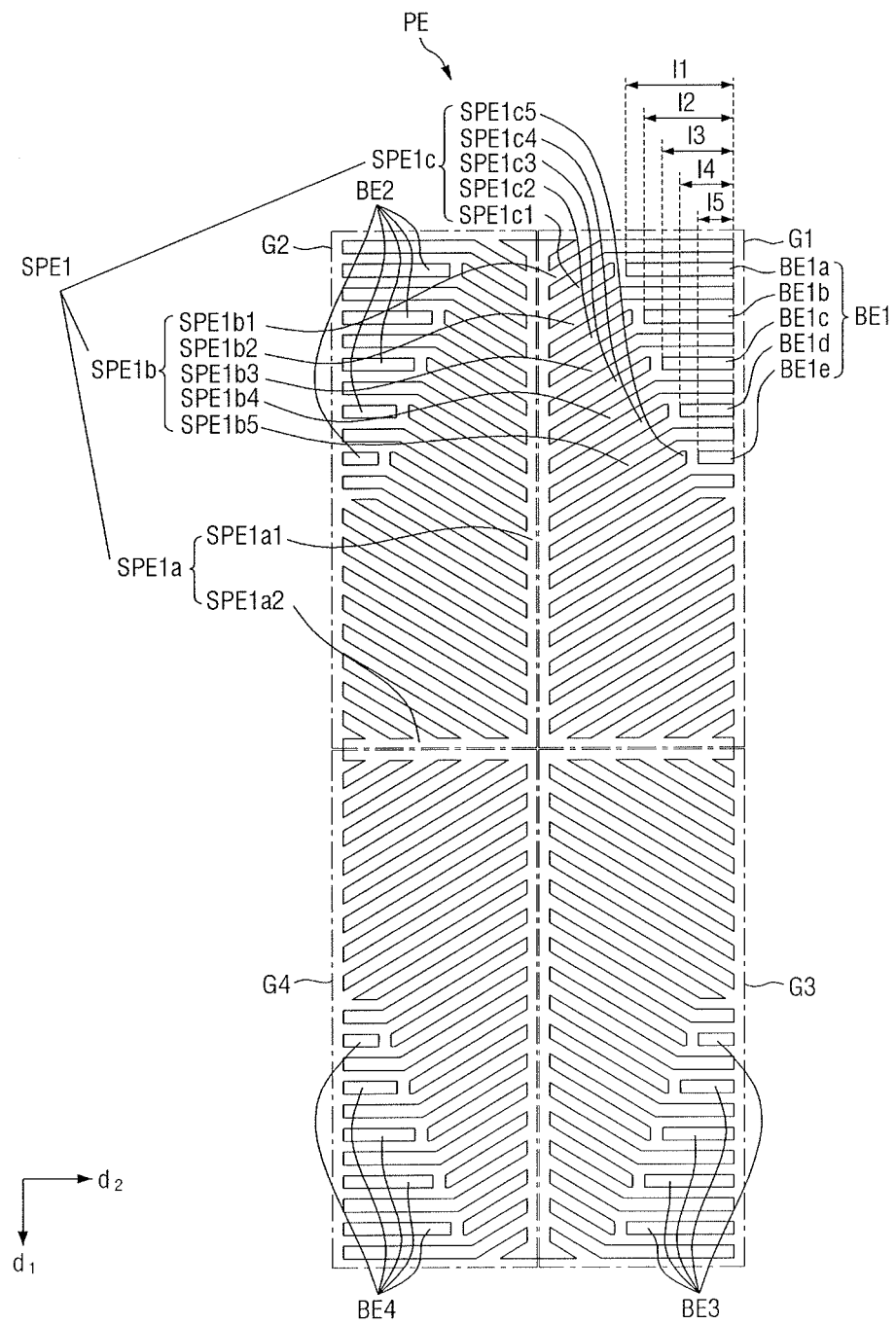

[FIG. 8]
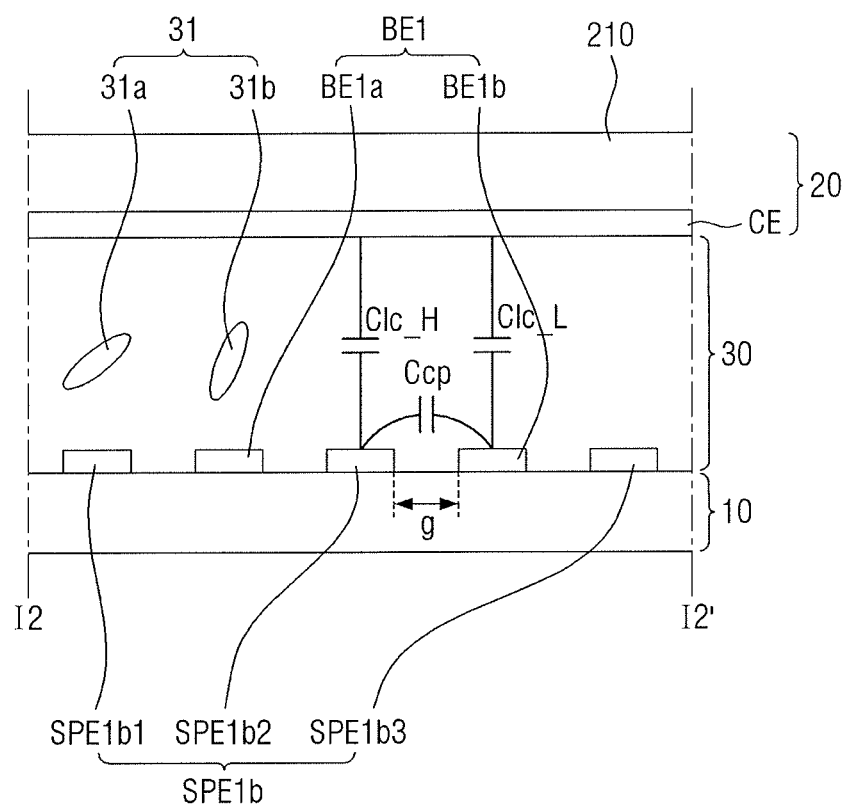

[FIG. 9]
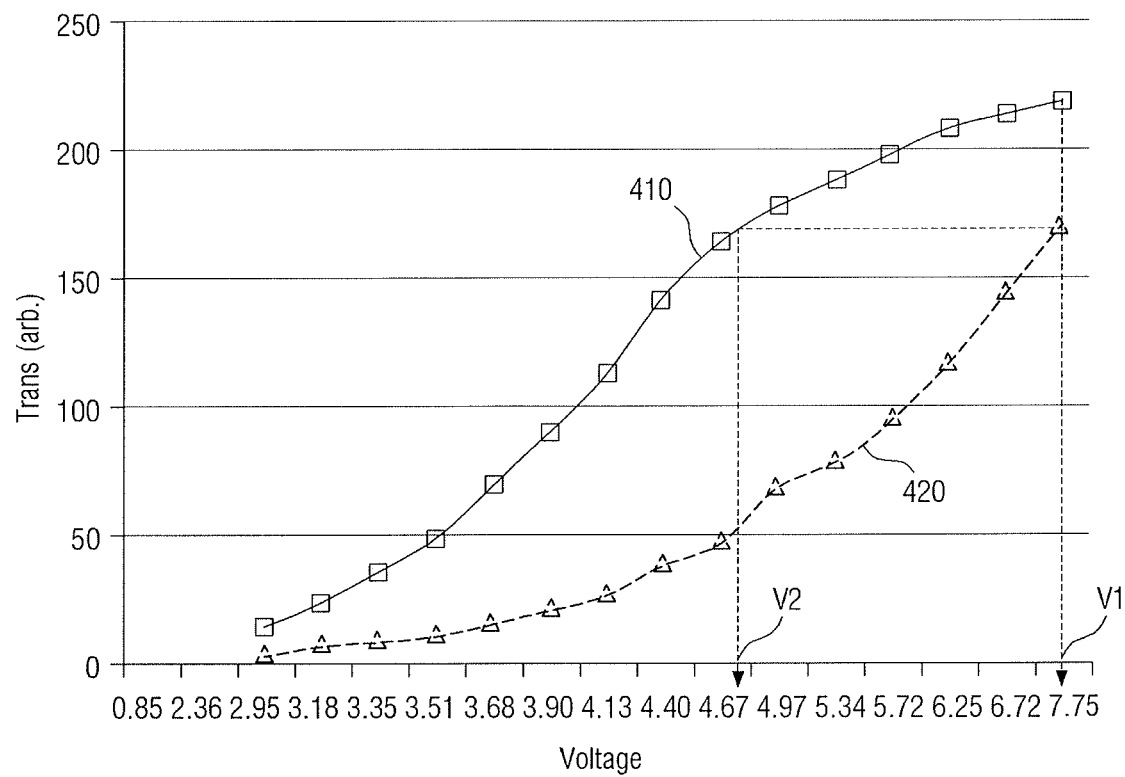

[FIG. 10]
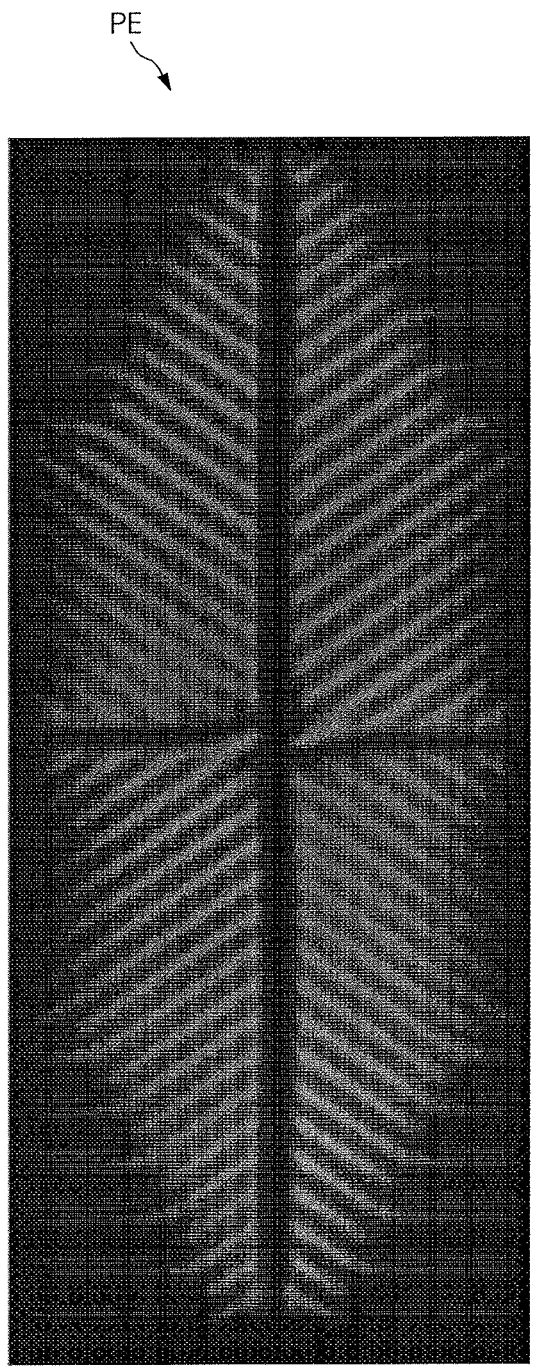

[FIG. 11]
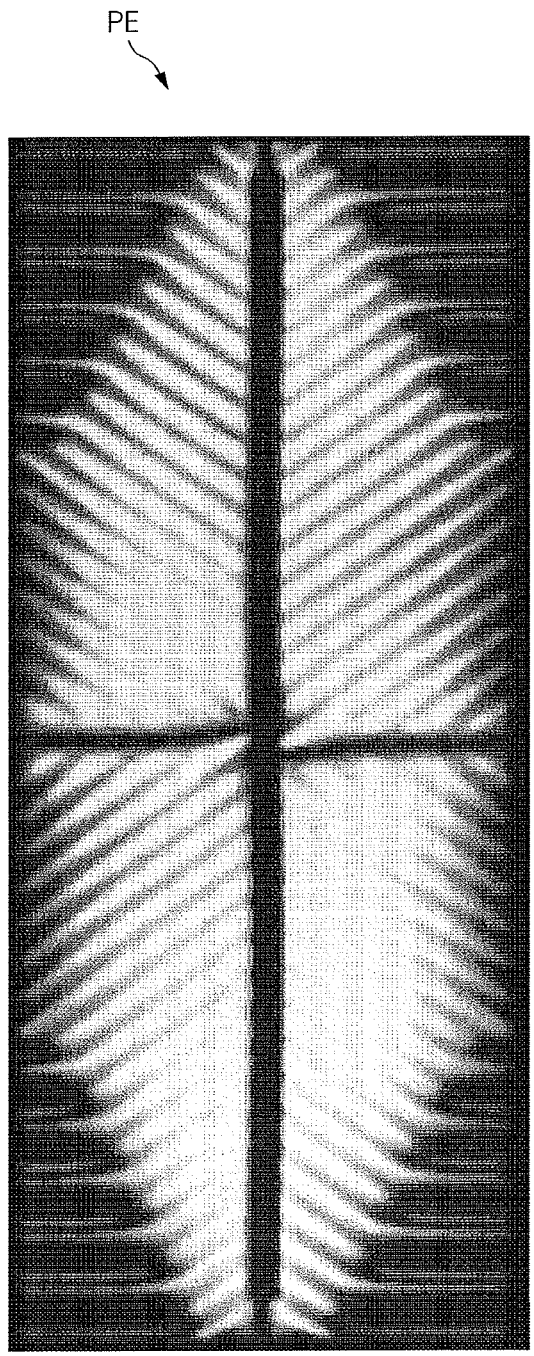

[FIG. 12]
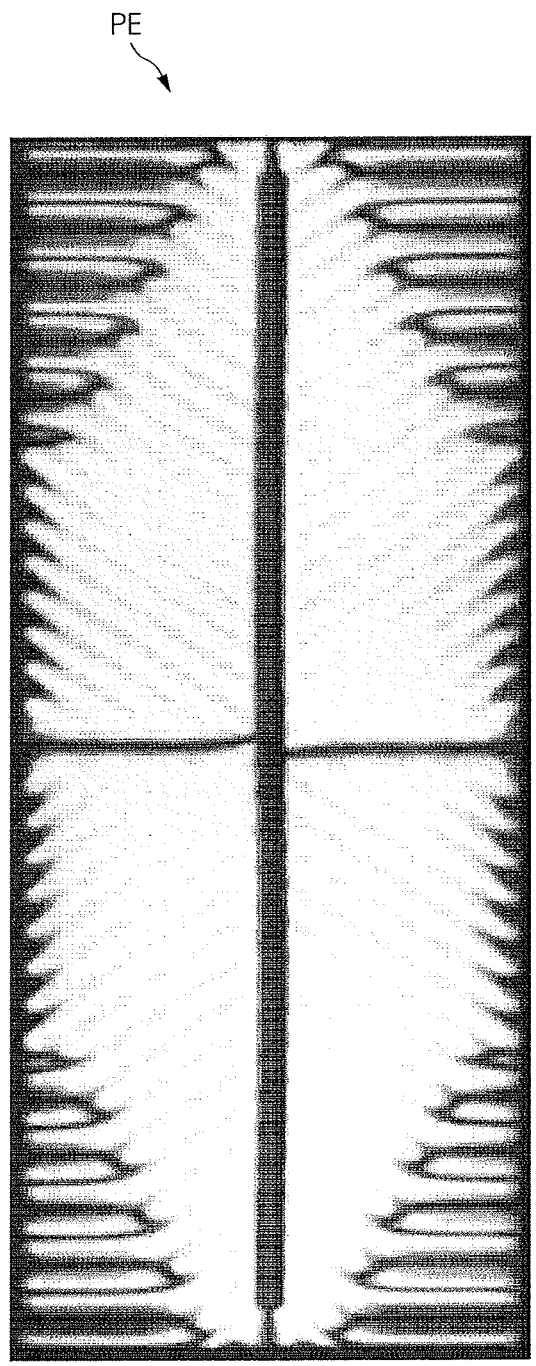

[FIG. 13]
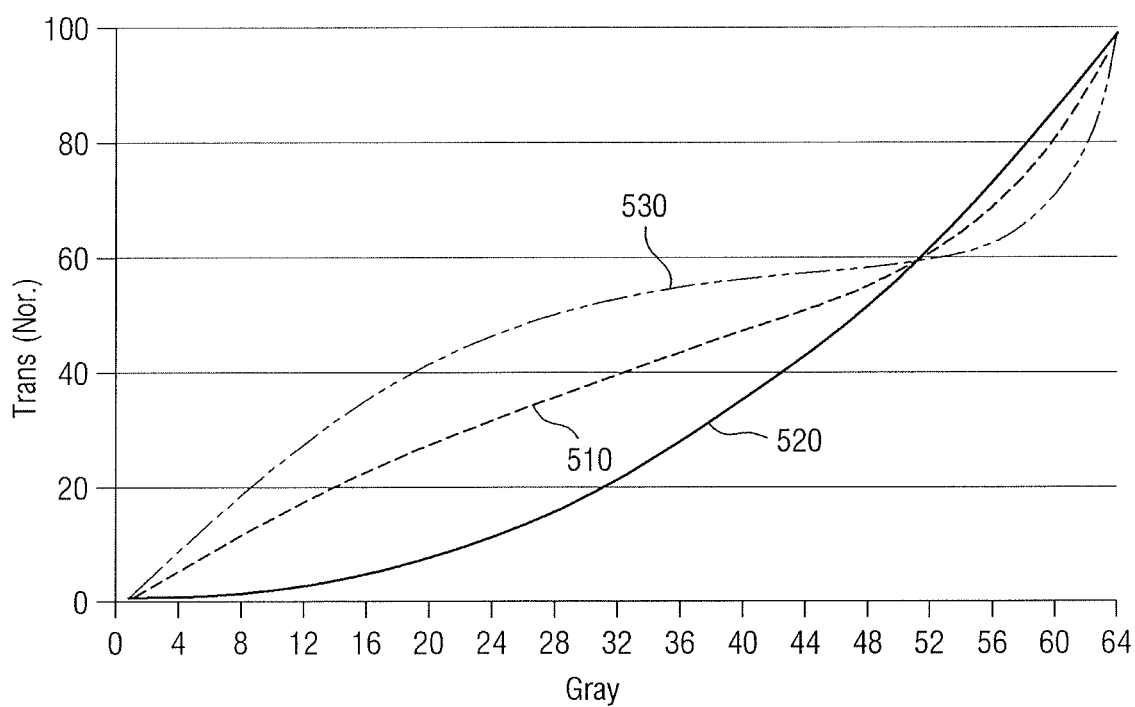

[FIG. 15]
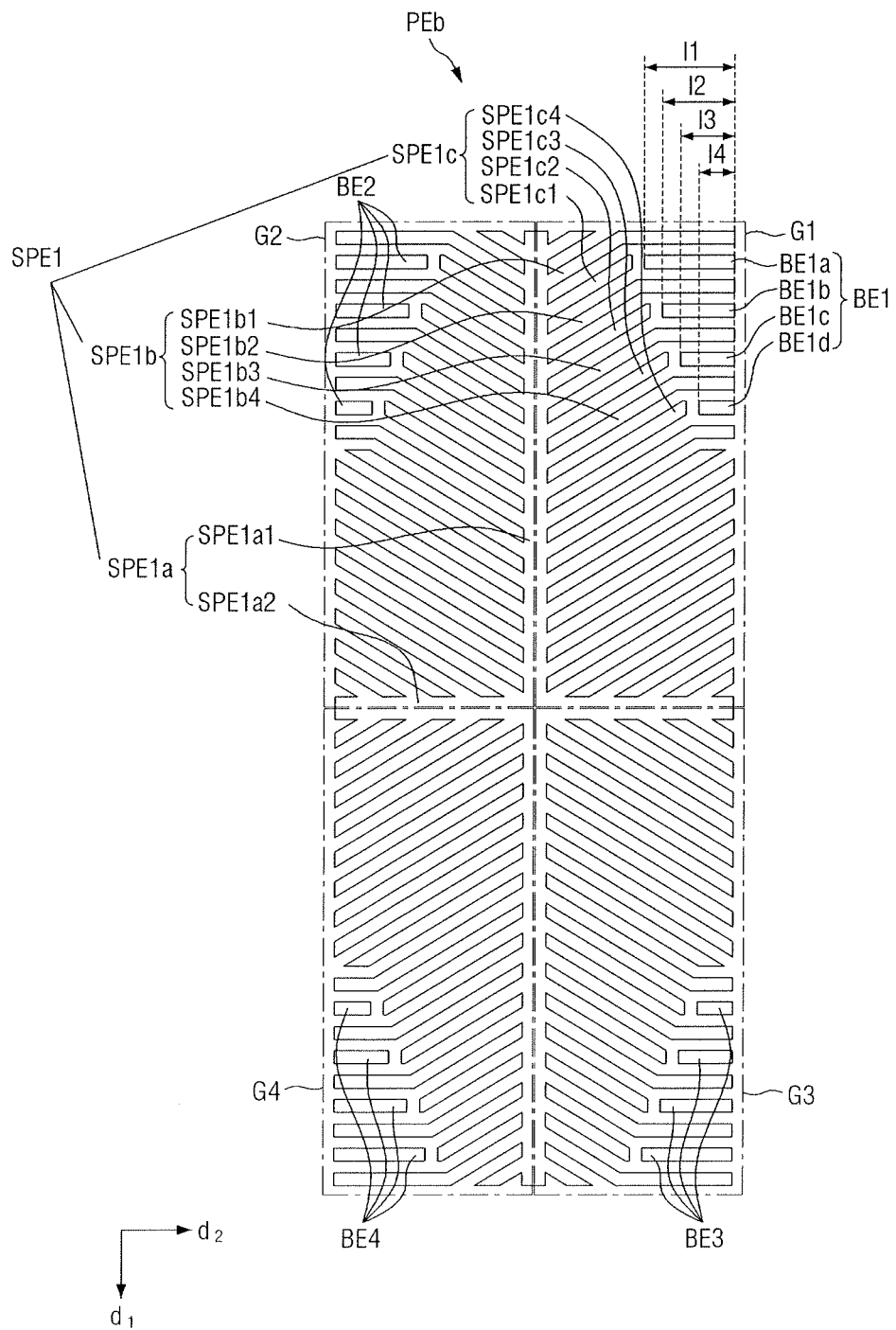

[FIG. 16]
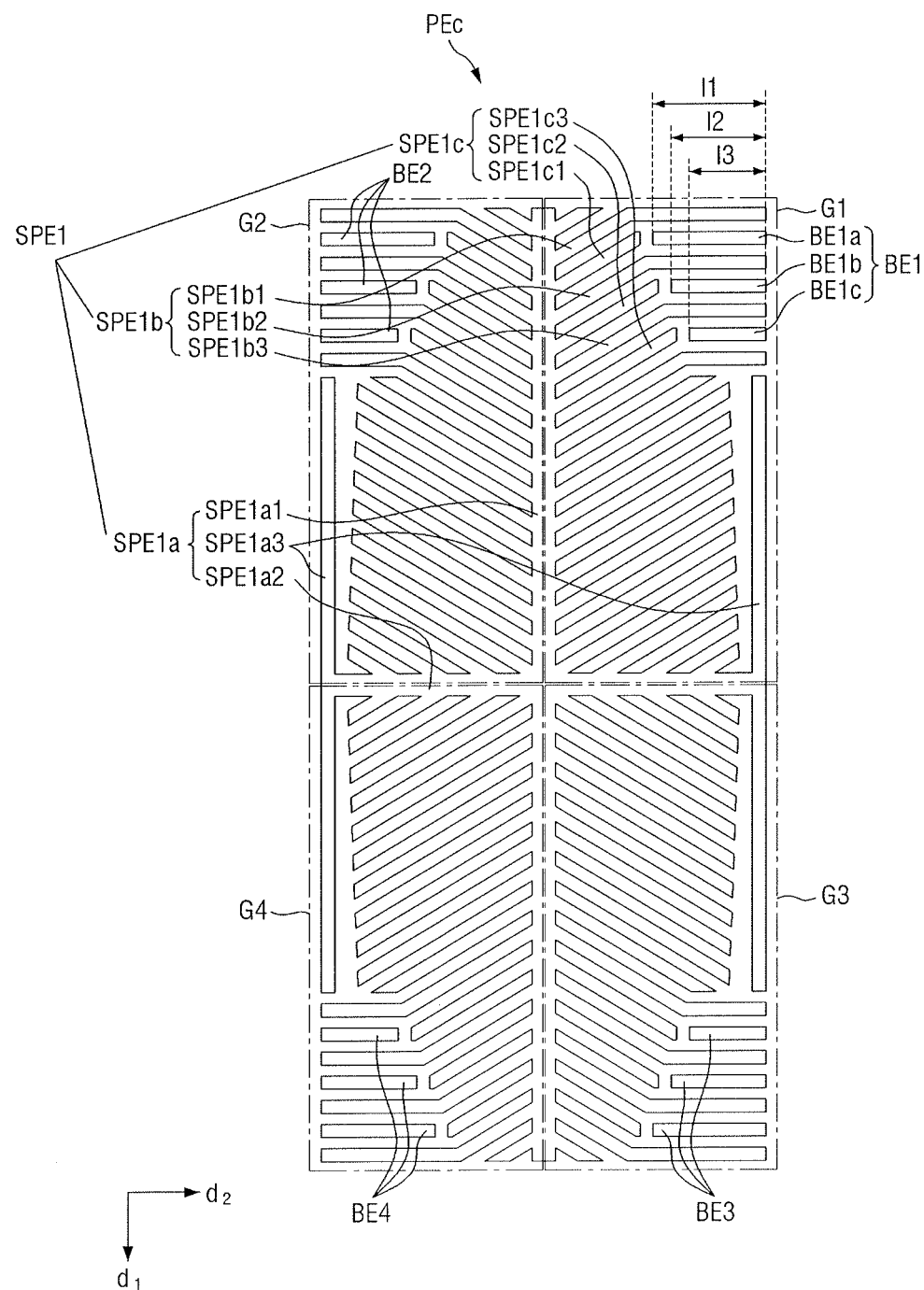

[FIG. 17]
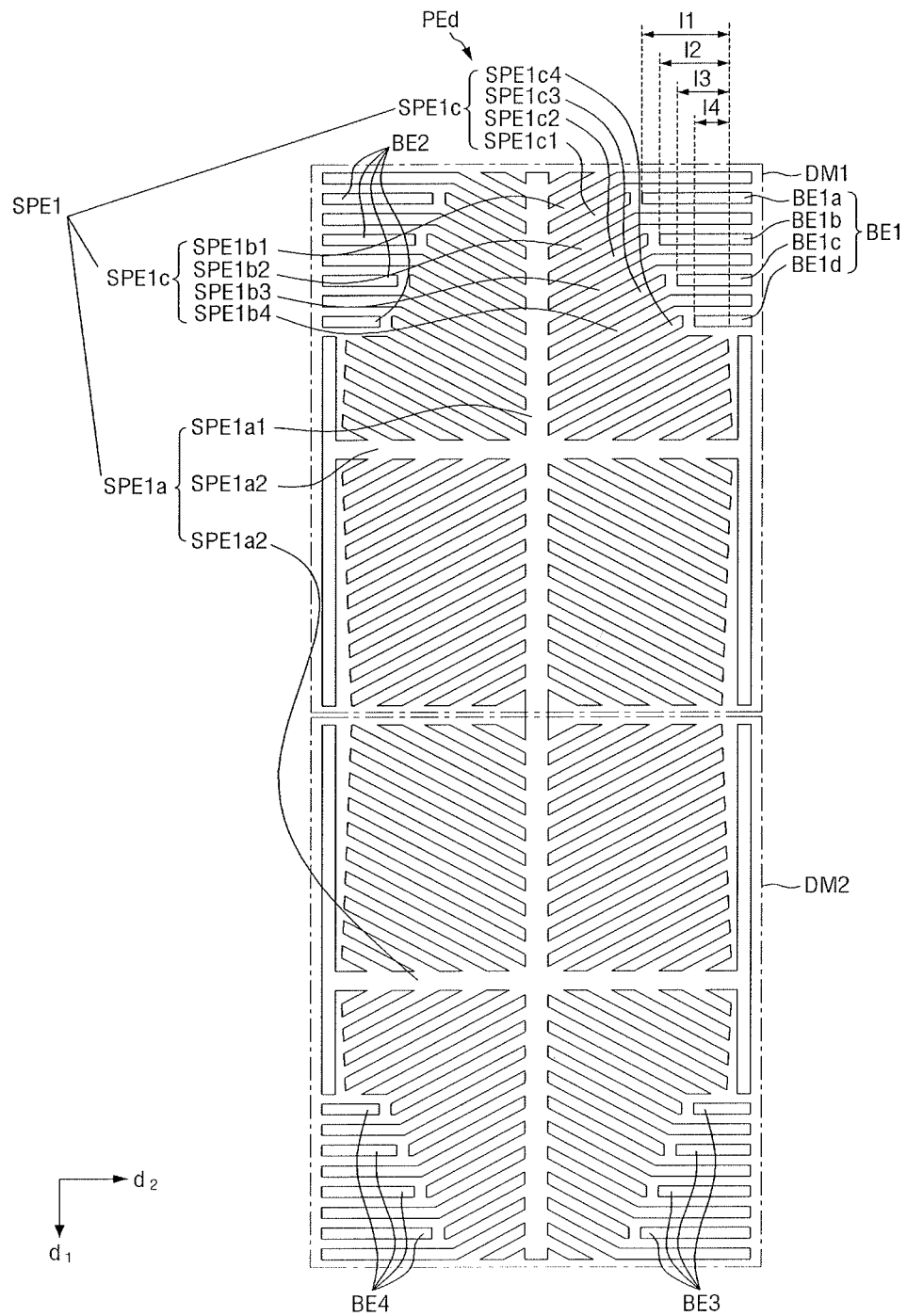

[FIG. 18]
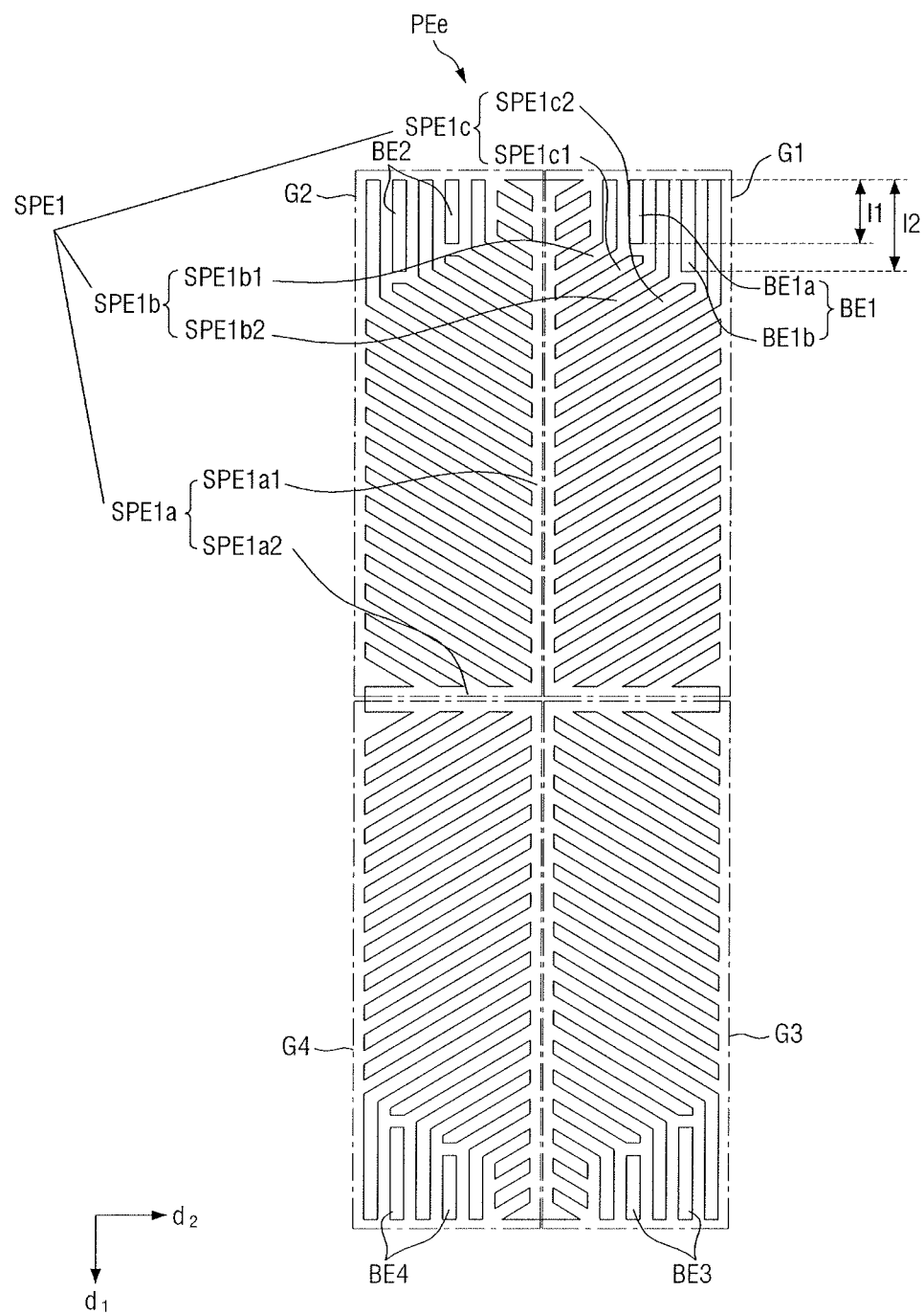

[FIG. 19]
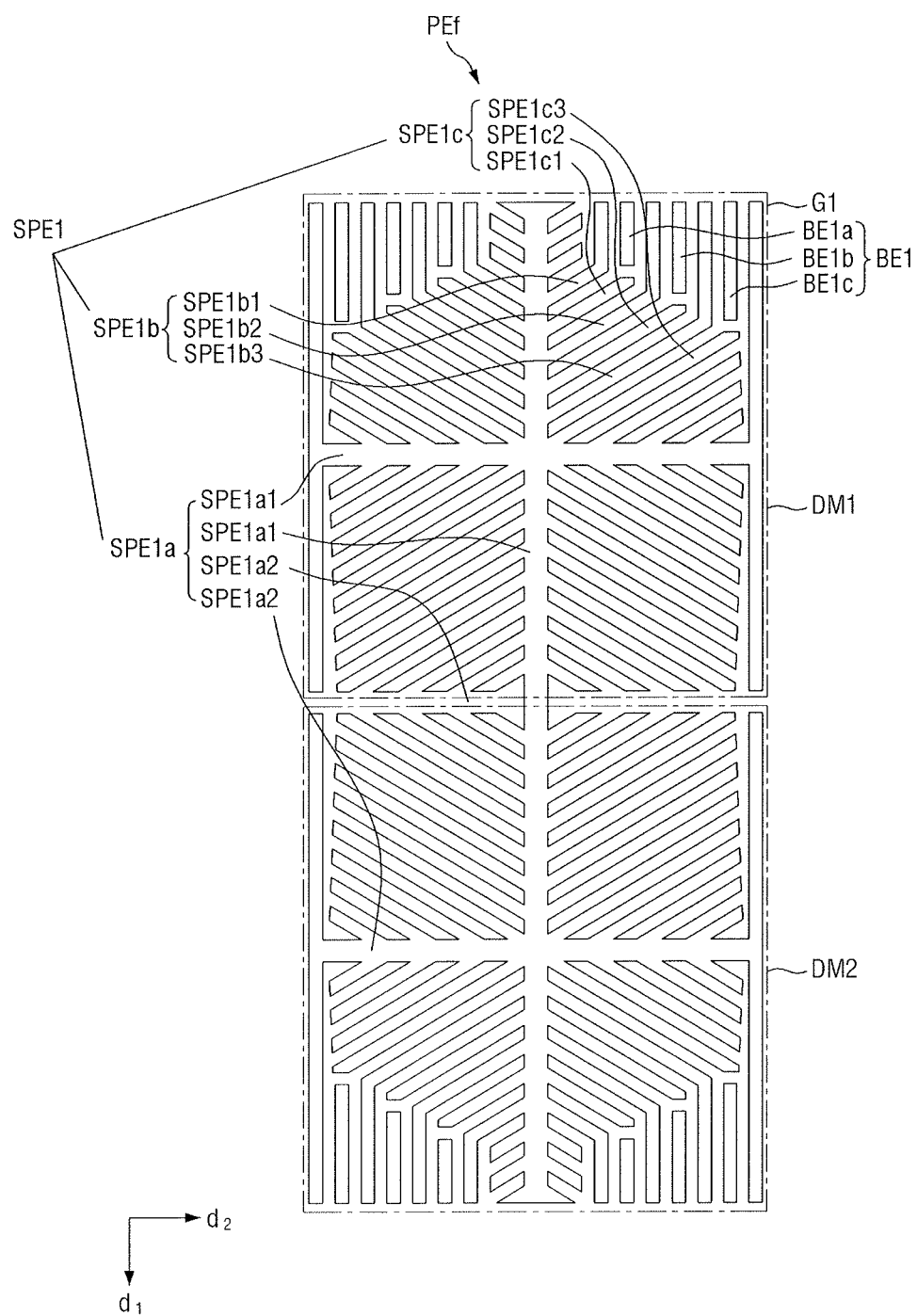

[FIG. 20]
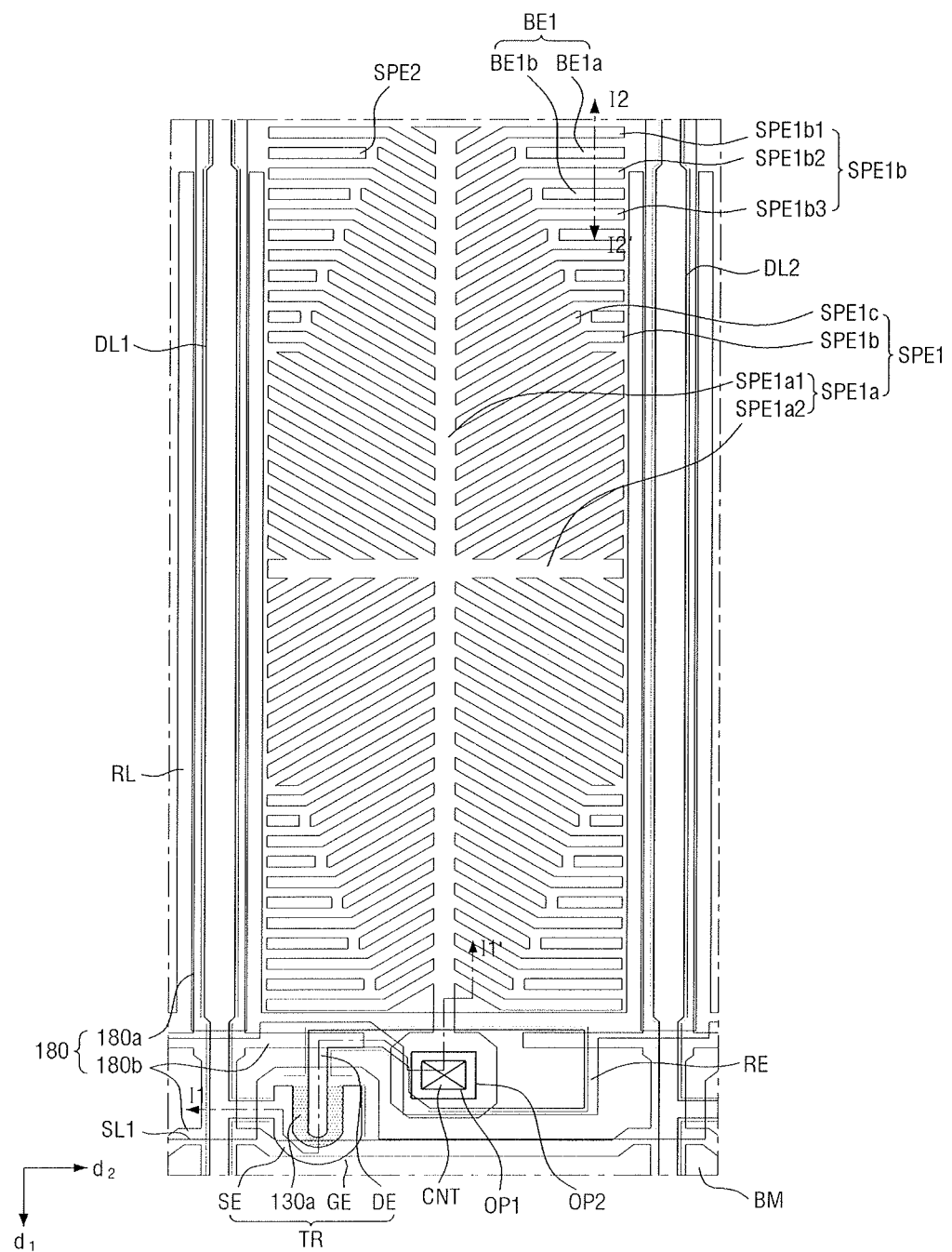

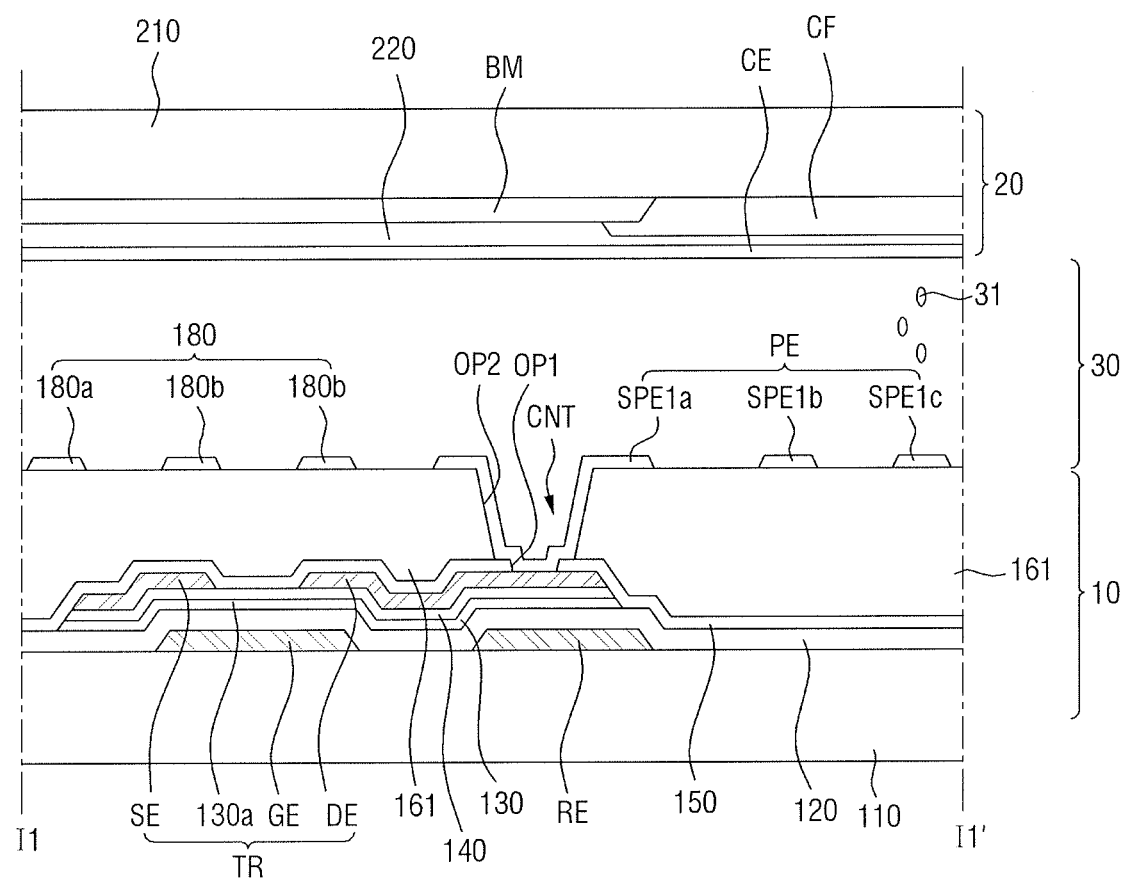
[FIG. 21]

LIQUID CRYSTAL DISPLAY

CROSS-REFERENCE TO RELATED APPLICATION

Korean Patent Application No. 10-2016-0060911, filed on May 18, 2016, and entitled, "Liquid Crystal Display," is incorporated by reference herein in its entirety.

BACKGROUND

1. Field

One or more embodiments described herein relate to a liquid crystal display.

2. Description of the Related Art

Various types of display devices have been developed. Examples include liquid crystal displays (LCDs) and organic light-emitting displays (OLEDs). An LCD includes a liquid crystal layer between substrates that include pixel electrodes and a common electrode. Voltages applied to the electrodes generate an electric field that controls the direction of liquid crystal molecules in the liquid crystal layer, thereby forming an image.

In one type of LCD known as a vertically aligned (VA) mode LCD, long axes of liquid crystals are aligned in a direction perpendicular to upper and lower substrates when no electric field is applied. Such an LCD has a high contrast ratio and a wide reference viewing angle. (A reference viewing angle may refer, for example, to a viewing angle with a contrast ratio of 1:10 or a limit angle for luminance inversion between gray levels).

In an LCD having a split structure, one pixel electrode is split into two subpixel electrodes. Different voltages applied to the subpixel electrodes produce different transmittances. This technique is employed in an attempt to produce a lateral visibility which is close to front visibility.

SUMMARY

In accordance with one or more embodiments, a liquid crystal display (LCD) includes a first substrate; a first subpixel electrode on the first substrate and including a first stem extending in a first direction and a plurality of branches extending from the first stem; a connecting electrode electrically connected to the first subpixel electrode; and a second subpixel electrode on a same layer as the first subpixel electrode and including a plurality of separation electrodes that do not overlap the connecting electrode, wherein at least one of the separation electrodes is between a first sub branch and a second sub branch which neighbor each other from among the branches and wherein the second subpixel electrode is a floating electrode.

The LCD may include a second substrate facing the first substrate; a common electrode on the second substrate and overlapping the first subpixel electrode and the second subpixel electrode; and a liquid crystal layer between the first substrate and the second substrate, the auxiliary capacitor having the liquid crystal layer as a dielectric.

The LCD may include a first liquid crystal capacitor capacitively coupled between the first subpixel electrode and the common electrode; a second liquid crystal capacitor capacitively coupled between the second subpixel electrode and the common electrode; and an auxiliary capacitor capacitively coupled between at least one of the separation electrodes and at least one of the first or second sub branches. The separation electrodes may be insulated from each other.

The LCD may include a scan line on the first substrate and extending in a second direction different from the first direction; a data line extending in the first direction and insulated from the scan line; and a switch connected to the scan line, the data line, and the first subpixel electrode. The connecting electrode may be connected to the switch.

The first subpixel electrode may include a second stem extending in the second direction different from the first direction and intersecting the first stem, and the separation electrodes may include a plurality of sub-separation electrodes on at least one of two sides of the first stem. The sub-separation electrodes may have different circumferences. The circumferences of sub-separation electrodes may decrease in a direction toward the second stem. The sub-separation electrodes may be at edges of the first subpixel electrode. An area of the second subpixel electrode may be about 5% to 10% of an area of the first subpixel electrode. The separation electrodes may be arranged alternately with the branches.

In accordance with one or more other embodiments, a liquid crystal display (LCD) includes a first substrate; a first subpixel electrode on the first substrate and including a first stem extending in a first direction, a first branch extending from the first stem, and a second branch extending from the first stem and neighboring the first branch; a second subpixel electrode on a same layer as the first subpixel electrode and including a separation electrode between the first branch and the second branch; a second substrate facing the first substrate; a common electrode on the second substrate and overlapping the first subpixel electrode and the second subpixel electrode; and an auxiliary capacitor capacitively coupled between at least one of the first branch or the second branch and the separation electrode.

The LCD may include a first liquid crystal capacitor capacitively coupled between the first subpixel electrode and the common electrode; and a second liquid crystal capacitor capacitively coupled between the second subpixel electrode and the common electrode. The second subpixel electrode may be a floating electrode.

The LCD may include a liquid crystal layer between the first and second subpixel electrodes and the common electrode, wherein the auxiliary capacitor includes the liquid crystal layer as a dielectric. The LCD may include a connecting electrode electrically connected to the first subpixel electrode, wherein the second subpixel electrode does not overlap the connecting electrode. The separation electrode may extend in the first direction or a second direction different from the first direction.

The LCD may include a scan line on the first substrate extending in the second direction different from the first direction; a data line extending in the first direction and insulated from the scan line; and a switch connected to the scan line, the data line and the first subpixel electrode. A distance between at least one of the first branch or the second branch and the separation electrode may be approximately 2.6 μm.

BRIEF DESCRIPTION OF THE DRAWINGS

Features will become apparent to those of skill in the art by describing in detail exemplary embodiments with reference to the attached drawings in which:

FIG. 1 illustrates an example of a pixel;

FIG. 2 illustrates a layout embodiment of a pixel;

FIG. 3 illustrates a cross-sectional view taken along line I1-I1' in FIG. 2;

FIG. 4 illustrates a cross-sectional view taken along line I2-I2' in FIG. 2;

FIG. 5 illustrates an embodiment of a gate conductor;

FIG. 6 illustrates an embodiment of a data conductor;

FIG. 7 illustrates an embodiment of a pixel electrode;

FIG. 8 illustrates operation of one embodiment of an LCD;

FIG. 9 illustrates an example of transmittance;

FIG. 10 illustrates an example of a pixel electrode in a low gray-level state;

FIG. 11 illustrates an example of a pixel electrode in an intermediate gray-level state;

FIG. 12 illustrates an example of a pixel electrode in a high gray-level state;

FIG. 13 illustrates an example of a degree of visibility improvement of an embodiment of an LCD;

FIGS. 15 to 19 illustrate additional embodiments of a pixel electrode;

FIG. 20 illustrates another layout embodiment of a pixel; and

FIG. 21 illustrates a cross-sectional view taken along line I1-I1' in FIG. 20.

DETAILED DESCRIPTION

Figure 14A:
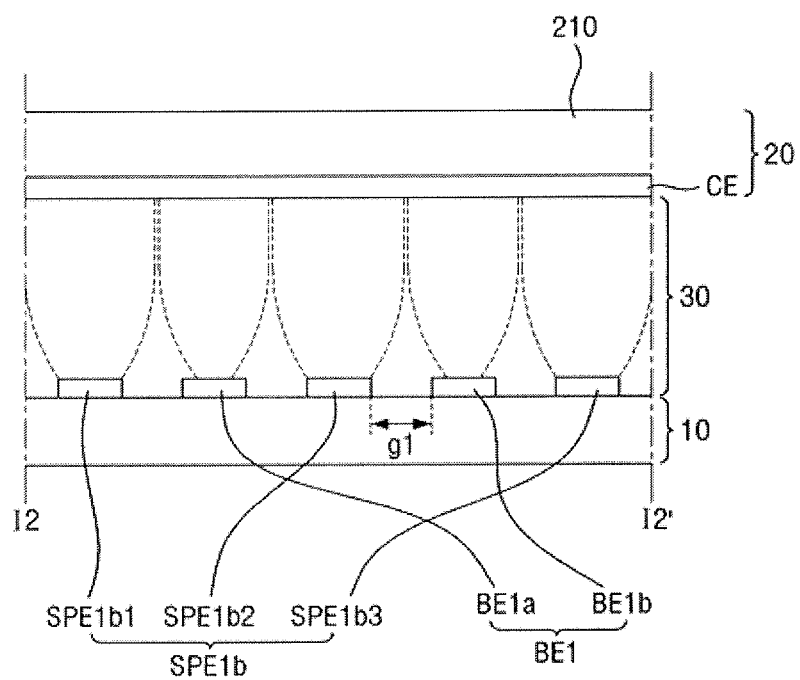
FIG. 14A illustrates an example of a fringe field at a high gray level of an LCD and FIG. 14B illustrates an example of a fringe field at a low gray level of the LCD.

Example embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will convey exemplary implementations to those skilled in the art. The embodiments (or portions thereof) may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 illustrates a pixel PX in a liquid crystal display. Referring to FIG. 1, the pixel PX may be connected to a first data line DL1 and a first scan line SL1. The first data line DL1 may extend in a first direction d1, and may receive a first data signal D1 from a data driver and provide the first data signal D1 to the pixel PX. The first scan line SL1 may extend in a second direction d2 different from the first direction d1. The first scan line SL1 may receive a first scan signal S1 from a scan driver and provide the first scan signal S1 to the pixel PX. The first direction d1 may perpendicularly intersect the second direction d2. In FIG. 1, the first direction d1 is a column direction and the second direction d2 is a row direction.

The pixel PX may include a switching device TR and a pixel electrode PE. The pixel electrode PE may include a first subpixel electrode SPE1 and a second subpixel electrode SPE2.

The switching device TR may be connected to the first scan line SL1, the first data line DL1, and the first subpixel electrode SPE1. In one embodiment, the switching device TR may be a three-terminal device such as a thin-film transistor (TFT) or another device. Hereinafter, a case where the switching device TR is a TFT will be described as an example.

The switching device TR may have a gate electrode connected to the first scan line SL1, a source electrode connected to the first data line DL1, and a drain electrode connected to the first subpixel electrode SPE1. Accordingly, the switching device TR may be turned on by the first scan signal S1 from the first scan line SL1 and may provide the first data signal D1 from the first data line DL1 to the first subpixel electrode SPE1.

The first subpixel electrode SPE1 may be capacitively coupled to a common electrode CE (see, e.g., FIG. 3). The first subpixel electrode SPE1 may overlap the common electrode CE in a direction perpendicular to a lower substrate 110 (see, e.g., FIG. 3). The pixel PX further includes a first liquid crystal capacitor Clc_H between the first subpixel electrode SPE1 and the common electrode CE.

In accordance with at least one embodiment, the overlapping of electrodes may include the case where the electrodes are arranged adjacent enough to be capacitively coupled to each other. The electrodes may be arranged in a horizontal direction or a vertical direction, provided they are capacitively coupled to each other. Hereinafter, a case where the electrodes overlap each other vertically will be described, as an example of a case where the two electrodes overlap each other in a direction perpendicular to the lower substrate 110. A case where the electrodes overlap each other horizontally will be described, as an example of a case where the electrodes overlap each other in a direction horizontal to the lower substrate 110.

The second subpixel electrode SPE2 may be electrically insulated from the outside. Thus, the second subpixel electrode SPE2 is in a floating state in which no signal is received from an external source. The second subpixel electrode SPE2 is not physically connected to the first subpixel electrode SPE1.

The second subpixel electrode SPE2 is on the same layer as the first subpixel electrode SPE1 and overlaps the first subpixel electrode SPE1 in the direction horizontal to the lower substrate 110. For example, the first subpixel electrode SPE1 may be capacitively coupled to the second subpixel electrode SPE2. Therefore, the pixel PX may be considered to include an auxiliary capacitor Ccp between the first subpixel electrode SPE1 and the second subpixel electrode SPE2. One electrode of the auxiliary capacitor Ccp may be the first subpixel electrode SPE1, and the other electrode of the auxiliary electrode Ccp may be the second subpixel electrode SPE2. The auxiliary capacitor Ccp includes a liquid crystal layer 30 (see, e.g., FIG. 3) between its two electrodes as a dielectric. An example is described with reference to FIG. 7.

The second subpixel electrode SPE2 may overlap the common electrode CE in the direction perpendicular to the lower substrate 110. Since the second subpixel electrode SPE2 is in the floating state as described above, no signal is transmitted directly to the second subpixel electrode SPE2 from an external source. However, the second subpixel electrode SPE2 may receive a certain voltage due to the auxiliary capacitor Ccp between the first subpixel electrode SPE1 and the second subpixel electrode SPE2.

In one embodiment, a voltage applied to the second subpixel electrode SPE2 may be approximately 0.65 times a voltage applied to the first subpixel electrode SPE1. In one embodiment, a voltage applied to the common electrode CE may be at a higher level than the voltage applied to the first subpixel electrode SPE1.

Accordingly, the pixel PX may include a second liquid crystal capacitor Clc_L which is capacitively coupled between the second subpixel electrode SPE2 and the common electrode CE based on a potential difference between the second subpixel electrode SPE2 and the common electrode CE. In one embodiment, the first liquid crystal capacitor Clc_H, the second liquid crystal capacitor Clc_L, and the auxiliary capacitor Ccp may use the liquid crystal layer 30 as a dielectric.

A voltage charged in the first liquid crystal capacitor Clc_H is at a different level from a voltage charged in the second liquid crystal capacitor Clc_L. Therefore, a plurality of liquid crystal molecules 31 (see, e.g., FIG. 7) may tilt at different angles even in one pixel PX. An example will be described with reference to FIG. 7.

FIG. 2 illustrates a layout embodiment of a pixel PX in an LCD. FIG. 3 illustrates a cross-sectional view taken along line I1-I1' in FIG. 2. FIG. 4 illustrates a cross-sectional view taken along line I2-I2' in FIG. 2. FIG. 5 is a plan view of an embodiment of a gate conductor GW in the pixel PX in FIG. 2. FIG. 6 is a plan view of an embodiment of a data conductor DW in the pixel PX of FIG. 2. FIG. 7 is a plan view of an embodiment of a pixel electrode PE in the pixel PX of FIG. 2. In FIGS. 2 to 7, the pixel PX connected to a first scan line SL1 and a first data line DL1 will be described.

Referring to FIGS. 2 to 7, a lower display panel 10 faces an upper display panel 20. A liquid crystal layer 30 is between the lower display panel 10 and the upper display panel 20 and includes a plurality of liquid crystal molecules 31. In an embodiment, the lower display panel 10 and the upper display panel 20 may be bonded together by sealing.

In one embodiment, the lower substrate 110 may be a transparent insulating substrate, e.g., a glass substrate, a quartz substrate, a transparent resin substrate, etc.

The gate conductor GW may be on the lower substrate 110 and may include the first scan line SL1 and a gate electrode GE. The first scan line SL1 may be on the lower substrate 110 to extend along the second direction d2.

The gate electrode GE is on the lower substrate 110 and connected to the first scan line SL1. The gate electrode GE may be on the same layer as the first scan line SL1. The gate electrode GE may protrude from the first scan line SL1. The gate electrode GE is one of the components that form a switching device TR.

The gate conductor GW may further include a storage line RL and a storage electrode RE. Referring to FIG. 5, in one embodiment, the storage line RL and the storage electrode RE may be on the same layer as the gate electrode GE and the first scan line SL1. The storage line RL may surround the pixel electrode PE. In an embodiment, the storage line RL may overlap at least one of the pixel electrode PE and a shielding electrode 180 in a direction perpendicular to the lower substrate 110. The storage electrode RE may be connected to the storage line RL. In an embodiment, the storage electrode RE may protrude from the storage line RL. The storage electrode RE may overlap at least one of the pixel electrode PE or the shielding electrode 180 in the direction perpendicular to the lower substrate 110.

Accordingly, the pixel PX may further include a storage capacitor which is capacitively coupled between at least one of the storage line RL or the storage electrode RE and at least one of the pixel electrode PE or the shielding electrode 180.

The gate conductor GW, that is, the first scan line SL1, the gate electrode GE, the storage line RL and the storage electrode RE may be a single layer, a double layer, or a triple layer including one conductive metal, at least two conductive metals, or three conductive metals selected, for example, from aluminum (Al), copper (Cu), molybdenum (Mo), chrome (Cr), titanium (Ti), tungsten (W), molybdenum tungsten (MoW), molybdenum titanium (MoTi), and copper/molybdenum titanium (Cu/MoTi). In one embodiment, the first scan line SL1, the gate electrode GE, the storage line RL, and the storage electrode RE may be formed simultaneously in the same mask process.

A gate insulating layer 120 may be on the first scan line SL1, the gate electrode GE, the storage line RL, and the storage electrode RE. In one embodiment, the gate insulating layer 120 may be made of silicon nitride (SiNx) or silicon oxide (SiOx). The gate insulating layer 120 may also have a multilayer structure including at least two insulating layers with different physical characteristics.

The data conductor DW may be on the gate insulating layer 120. The data conductor DW may include a semiconductor layer 130, the first data line DL1, a second data line DL2, a source electrode SE, and a data electrode DE.

The semiconductor layer 130 may be on the gate insulating layer 120. The semiconductor layer 130 may include a semiconductor pattern 130a that forms a channel region of the switching device TR. The semiconductor layer 130 may include, for example, an oxide semiconductor. The semiconductor layer 130 may include, for example, one oxide semiconductor selected from In—Ga-Zinc-Oxide (IGZO), ZnO, $ZnO_2$, CdO, SrO, $SrO_2$, CaO, $CaO_2$, MgO, $MgO_2$, InO, $In_2O_2$, GaO, $Ga_2O$, $Ga_2O_3$, SnO, $SnO_2$, GeO, $GeO_2$, PbO, $Pb_2O_3$, $Pb_3O_4$, TiO, $TiO_2$, $Ti_2O_3$, and $Ti_3O_5$. In another embodiment, the semiconductor layer 130 may include amorphous silicon, polycrystalline silicon, etc.

The data conductor DW may further include an ohmic contact layer 140 on the semiconductor layer 130. The ohmic contact layer 140 may include a material, for example, such as n+ hydrogenated amorphous silicon heavily doped with an n-type impurity such as phosphorous or may be made of silicide. When the semiconductor layer 130 includes an oxide semiconductor, ohmic contact layer 140 may be omitted.

The first data line DL1, the second data line DL2, the source electrode SE, and the drain electrode DE may be on the gate insulating layer 120 and the ohmic contact layer 140. The first data line DL1 and the second data line DL2 may be on the lower substrate 110 to extend along the first direction d1. The first data line DL1 and the second data line DL2 may be adjacent to each other. In one embodiment, adjacent may mean that no component, identical to two adjacent components, is between the two adjacent components.

The source electrode SE may branch off from the first data line DL1, and at least part of the source electrode SE may overlap the gate electrode GE in a direction perpendicular to the lower substrate 110. The drain electrode DE may overlap the gate electrode GE in the direction perpendicular to the lower substrate 110 and may be separated from the source electrode SE by a predetermined distance. In FIG. 2, the source electrode SE has a U shape, and the drain electrode DE is surrounded by the source electrode SE. The source electrode SE may have a different shape and/or the drain electrode DE may have a different arrangement relative to the source electrode SE in other embodiments.

The source electrode SE and the drain electrode DE form the switching device TR together with the semiconductor pattern 130a and the gate electrode GE. The source electrode SE of the switching device TR may be connected to the first data line DL1. The drain electrode DE of the switching device TR may be connected to a first subpixel electrode SPE1 by a contact hole CNT. The channel region of the switching device TR may be formed between the source electrode SE and the drain electrode DE by a first scan signal S1 (see, e.g., FIG. 1) from the first scan line SL1 through the gate electrode GE. The drain electrode DE may overlap the storage electrode RE in a direction perpendicular to the lower substrate 110.

The data conductor DW may be a single layer, a double layer, or a triple layer including one conductive metal, at least two conductive metals, or three conductive metals, for example, selected from aluminum (Al), copper (Cu), molybdenum (Mo), chrome (Cr), titanium (Ti), tungsten (W), molybdenum tungsten (MoW), molybdenum titanium (MoTi), and copper/molybdenum titanium (Cu/MoTi). The data conductor DW may include other metals or conductor materials in other embodiments.

Referring to FIG. 6, in one embodiment, the first data line DL1, the second data line DL2, the source electrode SE, and the drain electrode DE in the data conductor DW may be formed simultaneously in the same mask process. In this case, the first data line DL1, the second data line DL2, the source electrode SE, and the drain electrode DE may have substantially the same shape as the semiconductor layer 130, except for the semiconductor pattern 130a.

A first passivation layer 150 may be on the first data line DL1, the second data line DL2, the source electrode SE, and the drain electrode DE. The first passivation layer 150 may include a first opening OP1 which partially exposes the drain electrode DE. In one embodiment, the first passivation layer 150 may include, for example, an inorganic insulating material, e.g., silicon nitride or silicon oxide. The first passivation layer 150 may prevent introduction of a pigment of an organic insulating layer 160 into the semiconductor pattern 130a.

A color filter CF may be on the first passivation layer 150. The color filter CF emit light of one of a predetermined number of colors, e.g., red, green and blue. For example, the color filter CF of each pixel may include a material of a different color from the color of a material that forms the color filter CF in an adjacent pixel.

The organic insulating layer 160 may be on the first passivation layer 150. The organic insulating layer 160 may include a second opening OP2 which overlaps the first opening OP1 in a direction perpendicular to the lower substrate 110 and partially exposes the drain electrode DE. The organic insulating layer 160 may include an organic material having superior planarization characteristics and photosensitivity.

A second passivation layer 170 may be on the organic insulating layer 160. In one embodiment, the second passivation layer 170 may include an inorganic insulating material such as silicon nitride or silicon oxide.

The pixel electrode PE may be on the second passivation layer 170. The pixel electrode PE may include a transparent conductive material, e.g., indium tin oxide (ITO) or indium zinc oxide (IZO) or a reflective metal such as aluminum, silver, chrome or an alloy thereof.

The pixel electrode PE may include the first subpixel electrode SPE1 and a second subpixel electrode SPE2. The first subpixel electrode SPE1 may be on the same layer as the second subpixel electrode SPE2 and electrically insulated from the second subpixel electrode. SPE2. Each of the first subpixel electrode SPE1 and the second subpixel electrode SPE2 may overlap a common electrode CE in a direction perpendicular to the lower substrate 110.

Referring to FIG. 7, the first subpixel electrode SPE1 may include a first stem SPE1a1 extending in the first direction d1 and a second stem SPE1a2 extending in the second direction d2. The first stem SPE1a1 may intersect the second stem SPE1a2. In an embodiment, the first stem SPE1a1 may intersect the second stem SPE1a2 at a center of the pixel electrode PE. The pixel electrode PE may be divided into first through fourth areas G1 through G4 by the first stem SPE1a1 and the second stem SPE1a2.

The first subpixel electrode SPE1 may include a plurality of first branches SPE1b extending from one of the first stem SPE1a1 and the second stem SPE1a2. The first branches SPE1b may extend from one of the first stem SPE1a1 and the second stem SPE1a2 to be disposed in all of the first through fourth areas G1 through G4, as illustrated in FIG. 7. The first branches SPE1b may slope at a predetermined angle (e.g., an angle of 40 to 45 degrees) relative to the second direction d2. The term "angle" may denote, for example, an inclined angle formed by an object and a reference line (or a reference component). The inclined angle may be, for example, an acute angle. The first branches SPE1b are separated from each other. Accordingly, the first subpixel electrode SPE1 may include a plurality of slits SLT between the first branches SPE1b.

The first subpixel electrode SPE1 may include a plurality of second branches SPE1c extending from the first stem SPE1a1. The second branches SPE1c may extend from the first stem SPE1a1 to be disposed in all of the first through fourth areas G1 through 43, as illustrated in FIG. 7. The second branches SPE1c may slope at a predetermined angle (e.g., an angle of 40 to 45 degrees) relative to the second direction d2. The second branches SPE1c may be shorter than the first branches SPE1b. The second branches SPE1c may be separated from the second subpixel electrode SPE2 by a predetermined distance along the second direction d2.

The first branches SPE1b in the first through fourth areas G1 through G4 may be symmetrical to each other with respect to the first stem SPE1a1 and the second stem SPE1a2. In addition, the second branches SPE1c in the first through fourth areas G1 through G4 may be symmetrical to each other with respect to the first stem SPE1a1 and the second stem SPE1a2.

The first subpixel electrode SPE1 may be electrically connected to the drain electrode DE of the switching device TR, which is exposed by the contact hole CNT. Accordingly, the first subpixel electrode SPE1 may receive a first data signal D1 from the first data line DL1 through a switching operation of the switching device TR.

The second subpixel electrode SPE2 may be in a floating state in which no voltage is received directly from an external source. Accordingly, unlike the first subpixel electrode SPE1, the second subpixel electrode SPE2 may not directly receive the first data signal D1.

The second subpixel electrode SPE2 does not overlap a connecting electrode, which is electrically connected to the first subpixel electrode SPE1, in a direction perpendicular to the lower substrate 110. The connecting electrode may be, for example, an electrode electrically connected to the first subpixel electrode SPE1. Accordingly, the connecting electrode may be the drain electrode DE electrically connected to the first subpixel electrode SPE1.

Therefore, the second subpixel electrode SPE2 does not overlap the drain electrode DE in a direction perpendicular to the lower substrate 110. Accordingly, the second subpixel electrode SPE2 is not capacitively coupled to the drain electrode DE.

According to another embodiment, the connecting electrode may be a coupling electrode which overlaps the pixel electrode PE in a direction perpendicular to the lower substrate 110. The coupling electrode may be an electrode which is capacitively coupled to the pixel electrode PE in a direction perpendicular to the lower substrate 110. The coupling electrode may not be electrically connected to the first subpixel electrode SPE1.

Therefore, the connecting electrode may be the drain electrode DE, an electrode which extends from the drain electrode DE to overlap at least part of the pixel electrode PE in a direction perpendicular to the lower substrate 110, or an electrode capacitively coupled to the pixel electrode PE in a direction perpendicular to the lower substrate 110.

The second subpixel electrode SPE2 may include first through fourth separation electrodes BE1 through BE4. Referring to FIG. 7, the first through fourth separation electrodes BE1 through BE4 may be in the first through fourth areas G1 through G4, respectively. The first through fourth separation electrodes BE1 through BE4 may be horizontally and vertically symmetrical with respect to the first stem SPE1a1 and the second stem SPE1a2. In addition, the first through fourth separation electrodes BE1 through BE4 may be at corners of the pixel electrode PE, respectively. The first through fourth separation electrodes BE1 through BE4 do not overlap the connecting electrode in a direction perpendicular to the lower substrate 110.

Next, an example of a relationship between the first subpixel electrode SPE1 and the second subpixel electrode SPE2 will be described. The first branches SPE1b in the first area G1 will be described. In addition, the first separation electrodes BE1 in the first area G1 will be described.

At least one of first through fifth sub-separation electrodes BE1a through BE1e may be between two sub branches which neighbor each other, from among the first branches SPE1b in the first area G1. For example, the first branches SPE1b in the first area G1 may include first through fifth sub branches SPE1b1 through SPE1b5. The second branches SPE1c in the first area G1 may include first through fifth sub branches SPE1c1 through SPE1c5.

The first separation electrodes BE1 may include the first through fifth sub-separation electrodes BE1a through BE1e. The first through fifth sub-separation electrodes BE1a through BE1e may have different lengths. In an embodiment, the length l1 of the first sub-separation electrode BE1a may be greatest and the length l5 of the fifth sub-separation electrode BE1e may be the least, from among the first through fifth sub-separation electrodes BE1a through BE1e.

The first through fifth sub-separation electrodes BE1a through BE1e may be disposed alternately with the first through fifth sub branches SPE1b1 through SPE1b5 of the first branches SPE1*b*. For example, the first sub-separation electrode BE1*a* may be between the first sub branch SPE1*b*1 and the second sub branch SPE1*b*2 of the first branches SPE1*b*. Accordingly, the first sub-separation electrode BE1*a* may be capacitively coupled to at least one of the first sub branch SPE1*b*1 and the second sub branch SPE1*b*2 of the first branches SPE1*b*. In addition, the second sub-separation electrode BE1*b* may be between the second sub branch SPE1*b*2 and the third sub branch SPE1*b*3 of the first branches SPE1*b*. Accordingly, the second sub-separation electrode BE1*b* may be capacitively coupled to at least one of the second sub branch SPE1*b*2 and the third sub branch SPE1*b*3 of the first branches SPE1*b*.

The pixel PX may further include a plurality of auxiliary capacitors Ccp (see, e.g., FIG. 8) formed by capacitive coupling of the first branches SPE1*b* to the first through fourth separation electrodes BE1 through BE4. The auxiliary capacitors Ccp may include the liquid crystal layer 30 between the first branches SPE1*b* and the first through fourth separation electrodes BE1 through BE4 serving as a dielectric. An example will be described with reference to FIG. 8.

The shielding electrode 180 may be on the second passivation layer 170. The shielding electrode 180 may be on the same layer as the pixel electrode PE. However, the shielding electrode 180 may be electrically insulated from the pixel electrode PE. The shielding electrode 180 may include a transparent conductive material, such as ITO or IZO, or a reflective metal such as aluminum, silver, chrome or an alloy thereof. In one embodiment, the shielding electrode 180 may be formed at the same time as the pixel electrode PE, for example, by the same mask process.

The shielding electrode 180 may include a first sub-shielding electrode 180*a* which overlaps a plurality of data lines including the first data line DL1 and the second data line DL2 in a direction perpendicular to the lower substrate 110. In addition, the shielding electrode 180 may include a second sub-shielding electrode 180*b* which overlaps a plurality of scan lines including the first scan line SL1 in a direction perpendicular to the lower substrate 110. Accordingly, the first sub-shielding electrode 180*a* may extend substantially along the first direction d1, and the second sub-shielding electrode 180*b* may extend substantially along the second direction d2. The first sub-shielding electrode 180*a* may be electrically connected to the second sub-shielding electrode 180*b*.

Accordingly, the first sub-shielding electrode 180*a* may prevent leakage of light caused by coupling between data lines and pixel electrodes adjacent to each of the data lines. In addition, the second sub-shielding electrode 180*b* may prevent the leakage of light caused by the coupling between a plurality of scan lines and a plurality of pixel electrodes adjacent to each of the scan lines.

A first alignment layer may be on the pixel electrode PE and the shielding electrode 180. The first alignment layer may include, for example, polyimide.

An upper substrate 210 may face the lower substrate 110. The upper substrate 210 may include, for example, transparent glass or plastic. In an embodiment, the upper substrate 210 may include, for example, the same material as the lower substrate 110.

A black matrix BM may be on the upper substrate 210. The black matrix BM on the upper substrate 210 may block light from transmitting through areas other than a pixel area. According to an embodiment, the black matrix BM may include a metal material including organic matter or chrome.

A planarization layer 220 may be on the upper substrate 210 and the black matrix BM. The planarization layer 220 may include an insulating material. In some cases, the planarization layer 220 may be omitted.

The common electrode CE may be on the planarization layer 220. The common electrode CE may overlap the pixel electrode PE in a direction perpendicular to the lower substrate 110. In one embodiment, the common electrode CE may be shaped like a whole plate. In addition, according to an embodiment, the common electrode CE may include a transparent conductive material, such as ITO or IZO, or a reflective metal such as aluminum, silver, chrome or an alloy thereof.

A second alignment layer may be formed on the common electrode CE and may include, for example polyimide.

The liquid crystal layer 30 includes a plurality of liquid crystal molecules 31 having dielectric anisotropy and refractive anisotropy. In an embodiment, the liquid crystal molecules 31 may be arranged in a direction perpendicular to the lower substrate 110 in a state in which no electric field has been applied to the liquid crystal layer 30. In an embodiment, when an electric field is formed between the lower substrate 110 and the upper substrate 210, the liquid crystal molecules 31 may rotate or tilt in a certain direction, thereby changing polarization of light.

FIG. 8 illustrates an example of the operation of the LCD. FIG. 9 is a graph illustrating an example of transmittance with respect to the level of a voltage applied to each subpixel electrode when a gap between electrodes in FIG. 8 is approximately 2.6 μm. While FIG. 8 is a cross-sectional view taken along line I2-I2' of FIG. 2, only the first subpixel electrode SPE1 and the second subpixel electrode SPE2 in FIG. 8 are illustrated as being on the lower substrate 110 of the lower display panel 10. Also, only the common electrode CE is illustrated in FIG. 8 as being on the upper substrate 210 of the upper display panel 20, for ease of description. In the current embodiment, it is assumed that the liquid crystal molecules 31 are initially aligned in the direction horizontal to the lower substrate 110.

Referring to FIGS. 2, 7, and 8, the first subpixel electrode SPE1 electrically connected to the first data line DL1 may receive the first data signal D1 from the first data line DL1. The common electrode CE may receive, from an external source, a common voltage at a different level from the voltage of the first data signal D1. Accordingly, a first liquid crystal capacitor Clc_H, which uses the liquid crystal layer 30 as a dielectric, may be formed between the first subpixel electrode SPE1 and the common electrode CE. In FIG. 8, the first liquid crystal capacitor Clc_H is formed between the second sub branch SPE1*b*2 of the first branches SPE1*b* and the common electrode CE.

Since the second subpixel electrode SPE2 is in a floating state, it does not receive a voltage directly from an external source. However, the first sub-separation electrode BE1*a* and the second sub-separation BE1*b* of the second subpixel electrode SPE2 are arranged alternately with the first through third sub branches SPE1*b*1 through SPE1*b*3. Accordingly, the first sub-separation electrode BE1*a* may be capacitively coupled to at least one of the first sub branch SPE1*b*1 or the second sub branch SPE1*b*2, and the second sub-separation electrode BE1*b* may be capacitively coupled to at least one of the second sub branch SPE1*b*2 or the third sub branch SPE1*b*3.

The second sub-separation electrode BE1*b* is capacitively coupled to at least one of the second sub branch SPE1*b*2 or the third sub branch SPE1*b*3, thereby forming an auxiliary capacitor Ccp. For example, an electrode of the auxiliary capacitor Ccp may be the second sub-separation electrode BE1*b* and the other electrode of the auxiliary capacitor Ccp may be at least one of the second sub branch SPE1b2 or the third sub branch SPE1b3. In addition, the auxiliary capacitor Ccp includes the liquid crystal layer 30, which is located between the second sub-separation electrode BE1b and at least one of the second sub branch SPE1b2 or the third sub branch SPE1b3, as a dielectric.

Therefore, although the second sub-separation electrode BE1b does not receive a voltage directly from an external source, it may receive a certain voltage from at least one of the second sub branch SPE1b2 or the third sub branch SPE1b3 because it is capacitively coupled to at least one of the second sub branch SPE1b2 or the third sub branch SPE1b3. Accordingly, a second liquid crystal capacitor Clc_L, which uses the liquid crystal layer 30 as a dielectric, may be formed between the second subpixel electrode SPE2 and the common electrode CE.

In an embodiment, an area ratio (defined as a ratio of the area of the second subpixel electrode SPE2 to the area of the pixel electrode PE) may be approximately 10% The area ratio may be a different percentage in another embodiment.

The intensity of the voltage applied to the second sub-separation electrode BE1b may vary according to a gap g between the second sub-separation electrode BE1b and at least one of the second sub branch SPE1b2 or the third sub branch SPE1b3. For example, as the gap g between the second sub-separation electrode BE1b and at least one of the second sub branch SPE1b2 or the third sub branch SPE1b3 is reduced, the capacitance of the auxiliary capacitor Ccp may increase, thereby increasing the intensity of the voltage applied to the second sub-separation electrode BE1b.

Unlike the first subpixel electrode SPE1 which receives the first data signal D1 directly from the first data line DL1, the second subpixel electrode SPE2 receives a voltage indirectly through the auxiliary capacitor Ccp. Therefore, the voltage applied to the second subpixel electrode SPE2 may be at a lower level than the voltage applied to the first subpixel electrode SPE1. Accordingly, a voltage charged in the first liquid crystal capacitor Clc_H, which is capacitively coupled between the first subpixel electrode SPE1 and the common electrode CE, may be at a lower level than a voltage charged in the second liquid crystal capacitor Clc_L which is capacitively coupled between the second subpixel electrode SPE2 and the common electrode CE.

FIG. 9 illustrates an example of transmittance with respect to the level of a voltage applied to each subpixel electrode when the gap g between the electrodes of FIG. 8 is approximately 2.6 μm. (The gap size may be different in other embodiments.) In FIG. 9, reference character 410 indicates the first subpixel electrode SPE1 and reference character 420 indicates the second subpixel electrode SPE2. To express a gray level of 64, the first subpixel electrode SPE1 indicated by reference character 410 may require a voltage V1 of 7.75 V, and the second subpixel electrode SPE2 indicated by reference character 420 may require a voltage V2 of 4.67 V. Thus, in this example, to express the same gray level (64 G), the level of the voltage applied to the second subpixel electrode SPE2 may be approximately 0.65 times the level of the voltage applied to the first subpixel electrode SPE1.

FIG. 10 illustrates an embodiment of the pixel electrode PE in a low gray-level state in the LCD. FIG. 11 illustrates an embodiment of the pixel electrode PE in an intermediate gray-level state in the LCD. FIG. 12 illustrates an embodiment of the pixel electrode PE in a high gray-level state in the LCD.

Referring to FIGS. 10 to 12, it may be understood that areas expressing different gray levels exist even in one pixel PX. For example, a pixel PX which receives one data signal from one data line may be divided into an area displaying a high gray level and an area displaying a low gray level. This is because a voltage charged in the first liquid crystal capacitor Clc_H and a voltage charged in the second liquid crystal capacitor Clc_L have different levels, which cause liquid crystal molecules 31a and 31b (see, e.g., FIG. 8) to tilt at different angles even in one pixel PX.

Therefore, an image viewed from a side may be made to appear as close as possible to an image viewed from the front, by appropriately adjusting the voltage charged in the first liquid crystal capacitor Clc_H and the voltage charged in the second liquid crystal capacitor Clc_L. This may improve lateral visibility of the LCD.

FIG. 13 illustrates an example of the degree of improvement in visibility of the LCD. In FIG. 13, reference character 510 indicates a front GDI of the LCD and reference character 520 indicates a lateral GDI of the LCD. Reference character 530 indicates comparative example of a lateral GDI of a LCD (in which one switching device is connected to one pixel electrode).

Referring to FIG. 13, the lateral GDI (indicated by reference character 520) of the LCD according to one embodiment is relatively closer to the front GDI than the lateral GDI (indicated by reference character 530) of the comparative example. Referring to the Table below, the LCD according to one embodiment has a lower GDI than the comparative example LCD. Therefore, the LCD according to the embodiment has better visibility than the comparative example LCD.

TABLE

|  | Present Invention | Conventional Art |
|---|---|---|
| GDI | 0.36 | 0.43 |

In the LCD according to one embodiment, the auxiliary capacitor Ccp, which induces a voltage to the second subpixel electrode SPE2 in a floating state, uses the liquid crystal layer 30 as a dielectric, like the first and second liquid crystal capacitors Clc_H and Clc_L. Accordingly, even if the common voltage applied to the common electrode CE changes, the rate of change of the first and second liquid crystal capacitors Clc_H and Clc_L may be equal to the rate of change of the auxiliary capacitor Ccp. This may improve an afterimage phenomenon caused by a change in common voltage.

Figure 14B:
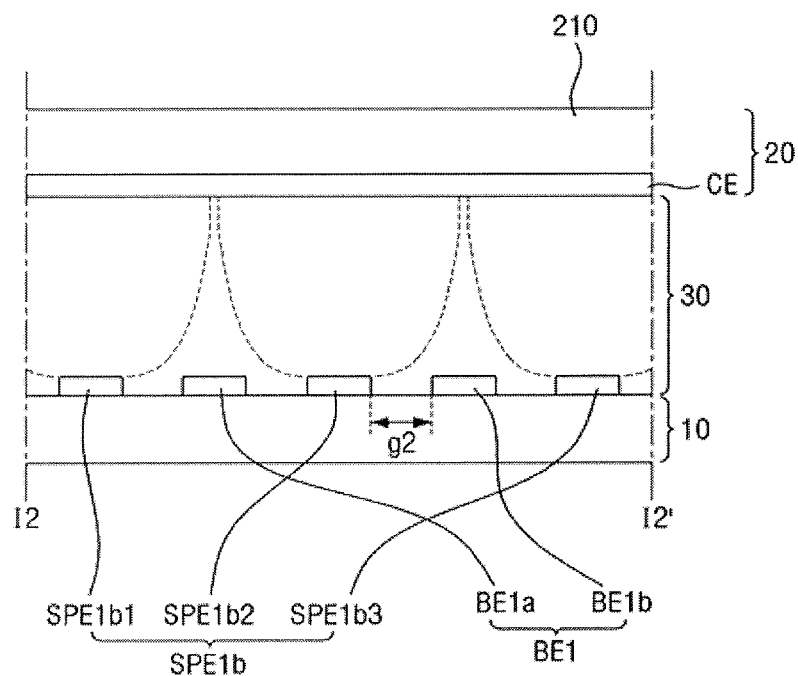

FIG. 14A illustrates an example of a fringe field formed at a high gray level of an LCD according to one embodiment, and FIG. 14B illustrates an example of a fringe field formed at a low gray level of the LCD according to an embodiment. For ease of description, FIGS. 14A and 14B are described based on a cross-sectional view taken along line I2-I2' in FIG. 2, focusing mainly on a fringe field between the first and second subpixel electrodes SPE1 and SPE2 and the common electrode CE.

Referring to FIGS. 2, 7, 8, and 14, the intensity of a voltage induced to the second subpixel electrode SPE2 may be lower at a low gray level than at a high gray level with a relatively high voltage level. Accordingly, the width of a fringe may be greater at the low gray level (FIG. 14B) than at the high gray level (FIG. 14A).

For example, referring to FIG. 14A, when an electric field is formed between the second subpixel electrode SPE2 and the common electrode CE, a fringe field may have a slope corresponding to a first gap g1 between the first sub branch SPE1b1 and the first sub-separation electrode BE1a. On the other hand, referring to FIG. 14B, when no electric field is formed between the second subpixel electrode SPE2 and the common electrode CE, the fringe field may have a slope corresponding to a second gap g2 between the first and second sub branches SPE1b1 and SPE1b2 of the first subpixel electrode SPE1. In an embodiment, the first gap g1 may be approximately 2.6 µm and the second gap g2 may be approximately 8.6 µm. These gap values may be different in other embodiments.

Since the fringe field illustrated in FIG. 14B has a smaller slope than the fringe field illustrated in FIG. 14A, the intensity of the electric field may be relatively higher. Accordingly, the LCD according to at least one embodiment may effectively control the direction of a plurality of liquid crystal molecules even at the low gray level (FIG. 14B).

In an LCD according to one embodiment, an area ratio defined as a ratio of the total area of the second subpixel electrode SPE2 to the total area of the pixel electrode PE may be a predetermined value, e.g., approximately 10%. Other embodiments of the pixel electrode PE will hereinafter be described with reference to FIGS. 15 through 19.

FIGS. 15 to 19 are plan views of other embodiments of the pixel electrode PE in the pixel PX of FIG. 2. For ease of description, the pixel electrode PE in FIG. 2 will be defined as a pixel electrode according to a first embodiment. In addition, a different reference character will be used for a pixel electrode according to a different embodiment, but a plurality of the same components in the pixel electrode will be indicated by the same reference characters in FIGS. 2 and 7.

Referring to FIG. 15, a pixel electrode PEb according to a second embodiment may include first through fourth separation electrodes BE1 through BE4. Each of the first through fourth separation electrodes BE1 through BE4 may include four sub-separation electrodes. For example, the first separation electrodes BE1 in a first area G1 include first through fourth sub-separation electrodes BE1a through BE1d and do not include a fifth sub-separation electrode BE1e. Accordingly, first branches SPE1b arranged alternatively with the first separation electrodes BE1 do not include a fifth sub branch SPE1b5.

Hence, an area ratio of the pixel electrode PEb according to the second embodiment may be approximately 5%. Thus, the pixel electrode PEb according to the second embodiment is different from the pixel electrode PE according to the first embodiment in terms of the number of sub-separation electrodes and the number of sub branches. Also, pixel electrode PEb according to the second embodiment is different from the pixel electrode PE according to the first embodiment in terms of area ratio.

The number of sub branches that constitute a first subpixel electrode SPE1 and the number of sub-separation electrodes that constitute a second subpixel electrode SPE2 are not limited to the examples in FIGS. 7 and 15, as long as the sub-separation electrodes are arranged alternately with the sub branches.

Referring to FIG. 16, a pixel electrode PEc according to a third embodiment may further include a third stem SPE1a3 extending in the first direction d1. The third stem SPE1a3 may be connected to an end of a second stem SPE1a2 and the other end of the second stem SPE1a2 which is located opposite the end of the second stem SPE1a2. At least part of the third stem SPE1a3 may overlap the storage line RL described above, thereby increasing the capacitance of the storage capacitor.

An area ratio of the pixel electrode PEc according to the third embodiment may be approximately 6%. In an embodiment, a plurality of first and second branches SPE1b and SPE1c may slope at an angle of approximately +35 degrees or −35 degrees with respect to the second direction d2. In addition, a length of the third stem SPE1a3 may vary according to the number of sub branches that constitute a first subpixel electrode SPE1 and the number of sub-separation electrodes that constitute a second subpixel electrode SPE2.

Referring to FIG. 17, a pixel electrode PEd according to a fourth embodiment may be divided into two domains, i.e., a first domain DM1 and a second domain DM2. In an embodiment, the first domain DM1 may be vertically symmetrical to the second domain DM2 in FIG. 17. Accordingly, a subpixel electrode located in the first domain DM1 may be identical in shape and size to a subpixel electrode located in the second domain DM2. An area ratio of the pixel electrode PEd according to the fourth embodiment may be approximately 6%. In an embodiment, a plurality of first and second branches SPE1b and SPE1c may slope at an angle of approximately +35 degrees or −35 degrees with respect to the second direction d2.

Referring to FIG. 18, a pixel electrode PEe according to a fifth embodiment may include first through fourth separation electrodes BE1 through BE4 extending in the first direction d1. Thus, a plurality of sub-separation electrodes in the first through fourth separation electrodes BE1 through BE4 may extend parallel to a first stem SPE1a1 along the first direction d1. Accordingly, first branches SPE1b extending from the first stem SPE1a1 at a predetermined angle may be bent to be arranged alternately with the first through fourth separation electrodes BE1 through BE4 extending along the first direction d1.

For the plurality of sub-separation electrodes, a separation electrode located relatively close to the first stem SPE1a1 may be shorter than a separation electrode located relatively far away from the first stem SPE1a1. For example, for the first separation electrodes BE1 in a first area G1, a first sub-separation electrode BE1a may have a length l1 less than a length l2 of a second sub-separation electrode BE1b.

In FIG. 18, the number of sub-separation electrodes in each of the first through fourth separation electrodes BE1 through BE4 is two. However, the number of sub-separation electrodes in each of the first through fourth separation electrodes BE1 through BE4 is not limited to that in FIG. 18, as long as the sub-separation electrodes are arranged alternately with a plurality of sub branches in the first branches SPE1b.

Referring to FIG. 19, a pixel electrode PEf according to a sixth embodiment may be divided into two domains, e.g., a first domain DM1 and a second domain DM2. In an embodiment, the first domain DM1 may be vertically symmetrical to the second domain DM2 in FIG. 19. Accordingly, a subpixel electrode in the first domain DM1 may be identical in shape and size to a subpixel electrode in the second domain DM2.

An area ratio of the pixel electrode PEf according to the sixth embodiment may be approximately 6%. In an embodiment, a plurality of first and second branches SPE1b and SPE1c may slope at an angle of approximately +35 degrees or −35 degrees with respect to the second direction d2.

First through fourth separation electrodes BE1 through BE4 in a second subpixel electrode SPE2 may not necessarily be symmetrical and may be different in shape and size in each area G1, G2, G3 or G4. In addition, at least two of a plurality of sub-separation electrodes in one of the first through fourth separation electrodes BE1 through BE4 may have the same circumference.

FIG. 20 is a schematic layout view of another embodiment of a pixel PX in an LCD, and FIG. 21 is a cross-sectional view taken along line I1-I1' in FIG. 20. Referring to FIGS. 20 and 21, the LCD may further include a protective layer 161 on a first passivation layer 150. In an embodiment, the protective layer 161 may include organic matter having photosensitivity and superior planarization characteristics. A color filter CF may not be located on a lower display panel 10, but on an upper display panel 20. For example, the color filter CF may be on a black matrix BM. Accordingly, a planarization layer 220 may be on the color filter CF.

The protective layer 161 may be omitted in some embodiments. In this case, a pixel electrode PE may be on the first passivation layer 150, and the color filter CF may be on the black matrix BM of the upper display panel 20.

In accordance with one or more of the aforementioned embodiments, an LCD may have improved lateral visibility in one pixel structure having one switching device and one contact hole. In addition, transmittance may be improved and the direction of liquid crystal molecules at a low gray level may be effectively controlled.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the embodiments set forth in the claims.

What is claimed is:

1. A liquid crystal display (LCD), comprising:
a first substrate;
a first subpixel electrode on the first substrate and including a first stem extending in a first direction and a plurality of branches extending from the first stem at a same direction;
a connecting electrode electrically connected to the first subpixel electrode; and
a second subpixel electrode on a same layer as the first subpixel electrode and including a plurality of separation electrodes that do not overlap the connecting electrode, wherein:
the separation electrodes extend at a distal end of respective ones of the branches of the first subpixel electrode in a direction away from the distal end,
at least one of the separation electrodes is between a first sub branch and a second sub branch which neighbor each other from among the branches, and
each separation electrode is a separate floating electrode such that each separation electrode is not directly connected to the first subpixel electrode, each separation electrode is insulated from the other separation electrodes, and each separation electrode does not receive a voltage directly from an external source.

2. The LCD as claimed in claim 1, further comprising:
a second substrate facing the first substrate;
a common electrode on the second substrate and overlapping the first subpixel electrode and the second subpixel electrode; and
a liquid crystal layer between the first substrate and the second substrate, wherein an auxiliary capacitor includes the liquid crystal layer as a dielectric.

3. The LCD as claimed in claim 2, further comprising:
a first liquid crystal capacitor capacitively coupled between the first subpixel electrode and the common electrode;
a second liquid crystal capacitor capacitively coupled between the second subpixel electrode and the common electrode; and
an auxiliary capacitor capacitively coupled between at least one of the separation electrodes and at least one of the first or second sub branches.

4. The LCD as claimed in claim 1, further comprising:
a scan line on the first substrate and extending in a second direction different from the first direction;
a data line extending in the first direction and insulated from the scan line; and
a switch connected to the scan line, the data line, and the first subpixel electrode.

5. The LCD as claimed in claim 4, wherein the connecting electrode is connected to the switch.

6. The LCD as claimed in claim 1, wherein:
the first subpixel electrode includes a second stem extending in a second direction different from the first direction and intersecting the first stem, and
the separation electrodes include a plurality of sub-separation electrodes on at least one of two sides of the first stem.

7. The LCD as claimed in claim 6, wherein the sub-separation electrodes have different circumferences.

8. The LCD as claimed in claim 7, wherein the circumferences of sub-separation electrodes decrease in a direction toward the second stem.

9. The LCD as claimed in claim 6, wherein the sub-separation electrodes are at edges of the first subpixel electrode.

10. The LCD as claimed in claim 1, wherein an area of the second subpixel electrode is about 5% to 10% of an area of the first subpixel electrode.

11. The LCD as claimed in claim 1, wherein the separation electrodes are arranged alternately with the branches.

12. A liquid crystal display (LCD), comprising:
a first substrate;
a first subpixel electrode on the first substrate and including a first stem extending in a first direction, a first branch extending from the first stem, a second branch extending from the first stem and neighboring the first branch, and a third branch extending from the first stem between the first branch and the second branch;
a second subpixel electrode on a same layer as the first subpixel electrode and including a separation electrode between the first branch and the second branch, wherein:
the separation electrode extends at a distal end of the third branch in a direction away from the distal end, and
the second subpixel electrode is a floating electrode such that the second subpixel electrode is not directly connected to the first subpixel electrode and does not receive a voltage directly from an external source;
a second substrate facing the first substrate;
a common electrode on the second substrate and overlapping the first subpixel electrode and the second subpixel electrode; and an auxiliary capacitor capacitively coupled between at least one of the first branch or the second branch and the separation electrode.

13. The LCD as claimed in claim 12, further comprising:
a first liquid crystal capacitor capacitively coupled between the first subpixel electrode and the common electrode; and
a second liquid crystal capacitor capacitively coupled between the second subpixel electrode and the common electrode.

14. The LCD as claimed in claim 12, further comprising:
a liquid crystal layer between the first and second subpixel electrodes and the common electrode, wherein the auxiliary capacitor includes the liquid crystal layer as a dielectric.

15. The LCD as claimed in claim 12, further comprising:
a connecting electrode electrically connected to the first subpixel electrode, wherein the second subpixel electrode does not overlap the connecting electrode.

16. The LCD as claimed in claim 12, wherein the separation electrode extends in the first direction or a second direction different from the first direction.

17. The LCD as claimed in claim 12, further comprising:
a scan line on the first substrate and extending in a second direction different from the first direction;
a data line extending in the first direction and insulated from the scan line; and
a switch connected to the scan line, the data line and the first subpixel electrode.

18. The LCD as claimed in claim 12, wherein a distance between at least one of the first branch or the second branch and the separation electrode is approximately 2.6 μm.

* * * * *